(12) United States Patent
Noguchi et al.

(10) Patent No.: US 8,345,983 B2
(45) Date of Patent: Jan. 1, 2013

(54) IMAGE PROCESSING APPARATUS, IMAGE PROCESSING METHOD, IMAGE PROCESSING SYSTEM AND COMPUTER READABLE MEDIUM

(75) Inventors: Yukinori Noguchi, Ashigarakami-gun (JP); Hirokazu Kameyama, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 235 days.

(21) Appl. No.: 12/689,980

(22) Filed: Jan. 19, 2010

(65) Prior Publication Data

US 2010/0119156 A1 May 13, 2010

Related U.S. Application Data

(63) Continuation of application No. PCT/JP2008/063464, filed on Jul. 18, 2008.

(30) Foreign Application Priority Data

Jul. 20, 2007 (JP) ................................ 2007-190148
Jun. 26, 2008 (JP) ................................ 2008-167811

(51) Int. Cl.
*G06K 9/00* (2006.01)
(52) U.S. Cl. .......................... 382/190; 382/236; 382/239
(58) Field of Classification Search .................. 382/190, 382/232, 239
See application file for complete search history.

(56) References Cited

U.S. PATENT DOCUMENTS

| | | | | |
|---|---|---|---|---|
| 5,177,608 A | * | 1/1993 | Ohki et al. | 348/416.1 |
| 5,854,856 A | * | 12/1998 | Moura et al. | 382/232 |
| 5,886,743 A | * | 3/1999 | Oh et al. | 375/240.02 |
| 6,798,424 B2 | * | 9/2004 | Nakamura | 345/629 |
| 7,436,888 B2 | * | 10/2008 | Kim et al. | 375/240.03 |
| 7,664,220 B2 | * | 2/2010 | Ajioka | 377/107 |
| 2002/0054338 A1 | | 5/2002 | Kimura | |
| 2006/0140279 A1 | | 6/2006 | Murakami et al. | |
| 2006/0204115 A1 | | 9/2006 | Burazerovic | |
| 2006/0280380 A1 | | 12/2006 | Li | |
| 2007/0165951 A1 | | 7/2007 | Akahori et al. | |
| 2007/0222858 A1 | * | 9/2007 | Sugimoto | 348/143 |
| 2010/0119156 A1 | * | 5/2010 | Noguchi et al. | 382/190 |

FOREIGN PATENT DOCUMENTS

| | | |
|---|---|---|
| CN | 1757240 A | 4/2006 |
| JP | 7-203427 A | 8/1995 |
| JP | 7-288806 A | 10/1995 |
| JP | 8-130733 A | 5/1996 |

(Continued)

*Primary Examiner* — Gregory M Desire
(74) *Attorney, Agent, or Firm* — Birch, Stewart, Kolasch & Birch, LLP

(57) ABSTRACT

An image processing apparatus includes a characteristic region detecting section that detects a characteristic region in an image, an image dividing section that divides the image into the characteristic region and a background region other than the characteristic region, and a compressing section that compresses a characteristic region image which is an image of the characteristic region and a background region image which is an image of the background region at different strengths from each other. The characteristic region detecting section detects the characteristic region in a plurality of moving-image-component images included in a moving image, the image dividing section divides each of the plurality of moving-image-component images into the characteristic region and the background region, and the compressing section compresses a characteristic region moving image including a plurality of characteristic region images and a background region moving image including a plurality of background region images at different strengths from each other.

12 Claims, 16 Drawing Sheets

FOREIGN PATENT DOCUMENTS

| | | |
|---|---|---|
| JP | 2828977 B2 | 11/1998 |
| JP | 3046379 B2 | 5/2000 |
| JP | 2002-58032 A | 2/2002 |
| JP | 2004-88615 A | 3/2004 |
| JP | 2006-13754 A | 1/2006 |
| JP | 2006-350498 A | 12/2006 |
| JP | 2007-174568 A | 7/2007 |
| JP | 2007-188419 A | 7/2007 |
| JP | 2009-230703 A | 10/2009 |
| JP | 2009-230704 A | 10/2009 |
| JP | 2009-245207 A | 10/2009 |
| JP | 2009-251892 A | 10/2009 |

* cited by examiner

IMAGE PROCESSING APPARATUS, IMAGE PROCESSING METHOD, IMAGE PROCESSING SYSTEM AND COMPUTER READABLE MEDIUM

CROSS REFERENCE TO RELATED APPLICATION

This is a continuation application of PCT/JP2008/063464 filed on Jul. 18, 2008 which claims priority from a Japanese Patent Applications
  No. 2007-190148 filed on Jul. 20, 2007
  No. 2008-167811 filed on Jun. 26, 2008
the contents of which are incorporated herein by reference. This patent application incorporates herein by reference the contents of Japanese Patent Applications No. 2008-078636 filed on Mar. 25, 2008, No. 2008-078641 filed on Mar. 25, 2008, No. 2008-091562 filed on Mar. 31, 2008, and No. 2008-098600 filed on Apr. 4, 2008.

BACKGROUND

1. Technical Field

The present invention relates to an image processing apparatus, an image processing method, an image processing system and a computer readable medium. More particularly, the present invention relates to an image processing apparatus, an image processing system, and an image processing method for processing images, and a computer readable medium for the image processing apparatus and image processing system.

2. Description of the Related Art

A known moving image coding apparatus compares a coded screen image and a to-be-coded screen image in order to identify a changed region within the screen, divides the to-be-coded screen image into a plurality of image blocks, and codes image blocks including the changed region, for example, as disclosed in Japanese Patent No. 2828977. When coding the image blocks including the changed region, this moving image coding apparatus assigns a larger number of information bits to image blocks containing a further limited region of the changed region than to image blocks containing the remaining region of the changed region. A known image coding apparatus filters an image signal selectively in at least one of the spatial and temporal axes and codes the resulting image signal, where the image signal is part of an input image signal and corresponds to a region other than a specified region, as disclosed in Japanese Patent No. 3046379.

The technique disclosed in Japanese Patent No. 2828977, however, requires a special logic to be incorporated into a coder, where the special logic assigns more information bits to particular image blocks such as eyes and a mouth. The technique disclosed in Japanese Patent No. 3046379 may reduce the data amount of a moving image to a certain degree by reducing high frequency components as a result of the filtering, but the filtering alone may not be able to achieve sufficient reduction in the data amount of the moving image.

SUMMARY

Therefore, it is an object of an aspect of the innovations herein to provide an image processing apparatus, an image processing method, an image processing system and a computer readable medium which are capable of overcoming the above drawbacks accompanying the related art. The above and other objects can be achieved by combinations described in the independent claims. The dependent claims define further advantageous and exemplary combinations of the innovations herein.

The characteristic region detecting section may detect the characteristic region in a plurality of moving-image-component images included in a moving image, the image dividing section may divide each of the plurality of moving-image-component images into the characteristic region and the background region, and the compressing section may compress a characteristic region moving image including a plurality of characteristic region images and a background region moving image including a plurality of background region images at different strengths from each other.

The characteristic region detecting section may detect a plurality of characteristic regions with different types of characters in the plurality of moving-image-component images included in the moving image, the image dividing section may divide each of the plurality of moving-image-component images into the plurality of characteristic regions and the background region other than the plurality of characteristic regions, and the compressing section may compress a plurality of characteristic region moving images at strengths determined in accordance with a plurality of pieces of character information of the plurality of characteristic regions.

The compressing section may include an image quality reducing section that compresses the plurality of characteristic region moving images by reducing image qualities of the plurality of characteristic region moving images in accordance with the plurality of pieces of character information.

The image processing apparatus may further include an image generating section that generates a plurality of characteristic region compression moving images used for compressing the plurality of characteristic region moving images and a background region compression moving image used for compressing the background region moving image, by duplicating the moving image. Here, the compressing section may compress the plurality of characteristic region moving images at the strengths determined in accordance with the plurality of pieces of character information.

The image processing apparatus may further include a value fixing section that sets, at a fixed value, a pixel value of a region other than the characteristic region in a plurality of moving-image-component images included in each of the plurality of characteristic region compression moving images. Here, the compressing section may compress each of the plurality of characteristic region moving images which includes the plurality of moving-image-component images in which the pixel value of the region other than the characteristic region is set at the fixed value, at the strength determined in accordance with a corresponding one of the plurality of pieces of the character information.

According to the second aspect related to the innovations herein, one exemplary image processing method may include detecting a characteristic region in an image, dividing the image into the characteristic region and a background region other than the characteristic region, and compressing a characteristic region image which is an image of the characteristic region and a background region image which is an image of the background region at different strengths from each other.

According to the third aspect related to the innovations herein, one exemplary computer readable medium storing therein a program for an image processing apparatus may provided. The program causes the image processing apparatus to function as a characteristic region detecting section that detects a characteristic region in an image, an image dividing section that divides the image into the characteristic region and a background region other than the characteristic region, and a compressing section that compresses a characteristic region image which is an image of the characteristic region and a background region image which is an image of the background region at different strengths from each other.

According to the fourth aspect related to the innovations herein, provided is an image processing apparatus including: a characteristic region detecting section that detects a characteristic region in an image, an image quality reducing section that generates a background region image by reducing an image quality of an image of a region containing the characteristic region and a non-characteristic region, a differential image generating section that generates a differential image representing a difference between an image of the characteristic region and a low-quality image obtained as a result of reduction in an image quality of the image of the characteristic region, and an output section that outputs the differential image and the background region image which are associated with each other.

The differential image generating section may generate the differential image representing the difference between an image of the characteristic region in the image and the low-quality image which is obtained as a result of enlargement of a resolution-reduced image of the characteristic region. The differential image generating section may generate the differential image representing the difference between an image of the characteristic region in the image and the low-quality image which is obtained as a result of reduction in high-frequency components, in a spatial frequency domain, of an image of the characteristic region.

The image quality reducing section may generate the background region image by reducing a resolution of the image of the region containing the characteristic region and the non-characteristic region, and the differential image generating section may generate the differential image representing the difference between the image of the characteristic region in the image and the low-quality image which is obtained as a result of enlargement of an image of the characteristic region in the background region image.

According to the fifth aspect of the innovations herein, provided is an image processing method, including: detecting a characteristic region in an image, generating a background region image by reducing an image quality of an image of a region containing the characteristic region and a non-characteristic region, generating a differential image representing a difference between an image of the characteristic region and a low-quality image obtained as a result of reduction in an image quality of the image of the characteristic region, and outputting the differential image and the background region image which are associated with each other.

According to the sixth aspect related to the innovations herein, one exemplary computer readable medium storing therein a program for an image processing apparatus may provided. The program causes the image processing apparatus to function as a characteristic region detecting section that detects a characteristic region in an image, an image quality reducing section that generates a background region image by reducing an image quality of an image of a region containing the characteristic region and a non-characteristic region, a differential image generating section that generates a differential image representing a difference between an image of the characteristic region and a low-quality image obtained as a result of reduction in an image quality of the image of the characteristic region, and an output section that outputs the differential image and the background region image which are associated with each other.

According to the seventh aspect related to the innovations herein, provided is an image processing system including: a characteristic region detecting section that detects a characteristic region in an image, an image quality reducing section that generates a background region image by reducing an image quality of an image of a region containing the characteristic region and a non-characteristic region, a differential image generating section that generates a differential image representing a difference between an image of the characteristic region and a low-quality image which is obtained as a result of reduction in an image quality of the image of the characteristic region, an image obtaining section that obtains the differential image and the background region image, an image adding section that adds together the differential image obtained by the image obtaining section and an image of the characteristic region in the background region image, to generate an addition image, and an image combining section that combines together the addition image and the background region image.

According to the eighth aspect of the innovations herein, provided is an image processing method, including: detecting a characteristic region in an image, generating a background region image by reducing an image quality of an image of a region containing the characteristic region and a non-characteristic region, generating a differential image representing a difference between an image of the characteristic region and a low-quality image which is obtained by reducing an image quality of the image of the characteristic region, obtaining the differential image and the background region image, adding together the differential image obtained in the obtaining and an image of the characteristic region in the background region image, to generate an addition image, and combining together the addition image and the background region image.

According to the ninth aspect related to the innovations herein, one exemplary computer readable medium storing therein a program for an image processing system may provided. The program causes the image processing system to function as a characteristic region detecting section that detects a characteristic region in an image, an image quality reducing section that generates a background region image by reducing an image quality of an image of a region containing the characteristic region and a non-characteristic region, a differential image generating section that generates a differential image representing a difference between an image of the characteristic region and a low-quality image which is obtained by reducing an image quality of the image of the characteristic region, an image obtaining section that obtains the differential image and the background region image, an image adding section that adds together the differential image obtained by the image obtaining section and an image of the characteristic region in the background region image, to generate an addition image, and an image combining section that combines together the addition image and the background region image.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 12B illustrates exemplary block configurations of a movement analyzing section 285a and a difference processing section 287a.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Figure 1:
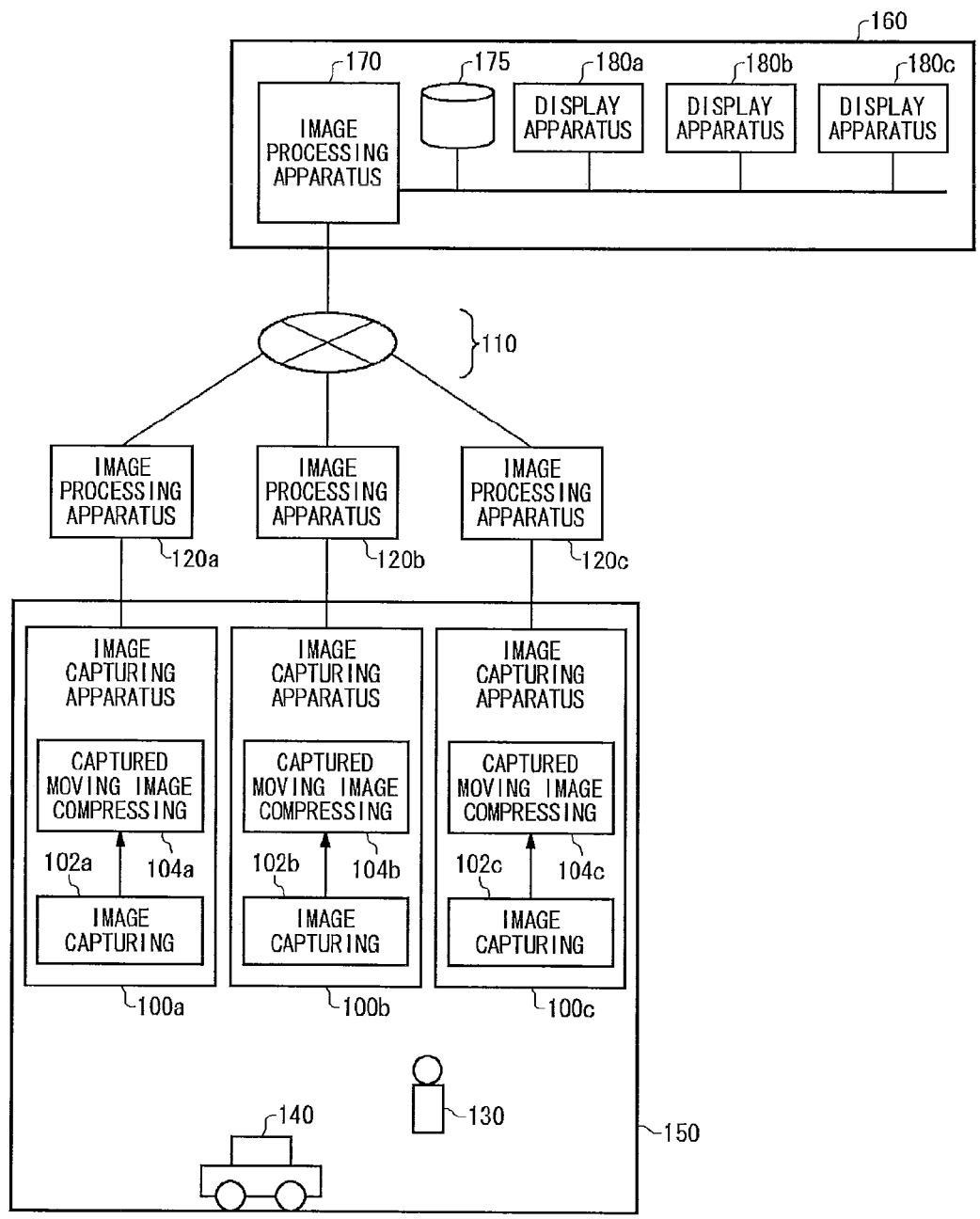
FIG. 1 illustrates an example of an image processing system 10 relating to an embodiment of the present invention.

FIG. 1 illustrates an example of an image processing system 10 relating to an embodiment of the present invention. The image processing system 10 is designed to maintain high quality of the image of a characteristic subject with it being possible to reduce the data amount of the entire image.

The image processing system 10 includes a plurality of image capturing apparatuses 100a to 100c (hereinafter collectively referred to as the image capturing apparatus 100) that capture images of a monitored space 150, a plurality of image processing apparatuses 120a to 120c (hereinafter collectively referred to as the image processing apparatus 120) that process the images, an image processing apparatus 170, a communication network 110, an image database 175, and a plurality of display apparatuses 180a to 180c (hereinafter collectively referred to as the display apparatus 180).

The image processing apparatus 120a is connected to the image capturing apparatus 100a. The image processing apparatus 120b is connected to the image capturing apparatus 100b. The image processing apparatus 120c is connected to the image capturing apparatus 100c. The image processing apparatus 170 and the display apparatus 180 are provided within a space 160 which is different from the monitored space 150.

The following describes the operations of the image capturing apparatus 100a, the image processing apparatus 120a, the image processing apparatus 170, and the display apparatus 180a. The image capturing apparatus 100a captures an image of the monitored space 150, MPEG-codes the captured moving image to generate captured moving image data, and outputs the generated captured moving image data to the image processing apparatus 120a to which the image capturing apparatus 100a is connected.

Here, the image capturing apparatus 100a includes an image capturing section 102a and a captured moving image compressing section 104a. The image capturing section 102a image-captures the monitored space 150, to generate a plurality of moving-image-component images that are included in a captured moving image. The image capturing section 102a may generate moving-image-component images in the RAW format. The captured moving image compressing section 104a performs color estimation (coinciding) processing on the moving-image-component images in the RAW format generated by the image capturing section 102a to obtain a captured moving image including a plurality of moving-image-component images, and compresses the captured moving image by using such a technique as the MPEG coding. In this manner, the captured moving image compressing section 104a generates the captured moving image data.

The image processing apparatus 120a obtains the captured moving image data generated by the image capturing apparatus 100a. The image processing apparatus 120a decodes the captured moving image data obtained from the image capturing apparatus 100a to generate the captured moving image, and detects a plurality of characteristic regions in the generated captured moving image. Here, the characteristic regions contain different types of characters including a person 130 and a moving article 140 such as a vehicle. Based on the captured moving image, the image processing apparatus 120a generates a plurality of characteristic region moving images in a one-to-one correspondence with the characters of different types. In each characteristic region moving image, a corresponding one of the characteristic regions has a higher image quality than the remaining region. The image processing apparatus 120a also generates a background region moving image that is a moving image of a background region of the captured moving image excluding the characteristic regions. The background region moving image has a lower image quality than the characteristic region moving images.

The image processing apparatus 120a respectively codes the characteristic region moving images and the background region moving image, to generate a plurality of pieces of characteristic region moving image data and a piece of background region moving image data. At the same time, the image processing apparatus 120a associates the pieces of characteristic region moving image data and the piece of background region moving image data with each other, and transmits the pieces of characteristic region moving image data and the piece of background region moving image data which are associated with each other, to the image processing apparatus 170 via the communication network 110.

The image processing apparatus 170 respectively decodes the pieces of characteristic region moving image data and the piece of background region moving image data, which are associated with each other and received from the image processing apparatus 120a, to obtain a plurality of characteristic region moving images and a background region moving image. The image processing apparatus 170 combines the characteristic region moving images and the background region moving image to generate a single combined moving image, and provides the combined moving image to the display apparatus 180a. The display apparatus 180a displays the moving image provided from the image processing apparatus 170.

The image processing apparatus 170 may record the combined moving image or the captured moving image data obtained from the image processing apparatus 120a onto the image database 175. The image processing apparatus 170 may supply the combined moving image which is recorded on the image database 175 to the display apparatus 180a in response to a request issued by the display apparatus 180a. The image processing apparatus 170 may decode, as mentioned above, the captured moving image data which is recorded on the image database 175 and supply the resulting moving image to the display apparatus 180a, in response to a request issued by the display apparatus 180a. The image database 175 may have a non-volatile recording medium such as a hard disk, and record the combined moving image supplied from the image processing apparatus 170 on the recording medium.

The image capturing apparatuses 100b and 100c respectively include constituents having the same functions as the constituents of the image capturing apparatus 100a. The image capturing apparatuses 100b and 100c have the same functions and operations as the image capturing apparatus 100a, except that the image capturing apparatuses 100b and 100c respectively supply the captured moving image data to the image processing apparatuses 120b and 120c. Hence, the image capturing apparatuses 100b and 100c are not explained herein. Note that the following description may refer to the image capturing sections 102a to 102c as the image capturing section 102 and may refer to the captured moving image compressing sections 104a to 104c as the captured moving image compressing section 104.

The image processing apparatuses 120b and 120c may have the same functions and operations as the image processing apparatus 120a, except that the image processing apparatuses 120b and 120c respectively obtain the captured moving image data from the image capturing apparatuses 100b and 100c. Hence, the image processing apparatuses 120b and 120c are not explained herein. The image processing apparatus 170 generates a single moving image based on a plurality of pieces of characteristic region moving image data and a piece of background region moving image data which are associated with each other and received from each of the image processing apparatuses 120b and 120c, and supplies the single moving image to a corresponding one of the display apparatuses 180b and 180c. The display apparatuses 180b and 180c respectively display the moving images supplied from the image processing apparatus 170.

When utilized as a monitoring system, for example, the image processing system 10 relating to the present embodiment may be capable of keeping high-quality images of a person, a moving article, and other characteristic subjects to be monitored. In addition, the image processing system 10 relating to the present embodiment may be capable of reducing the data amount of the moving images.

Figure 2:
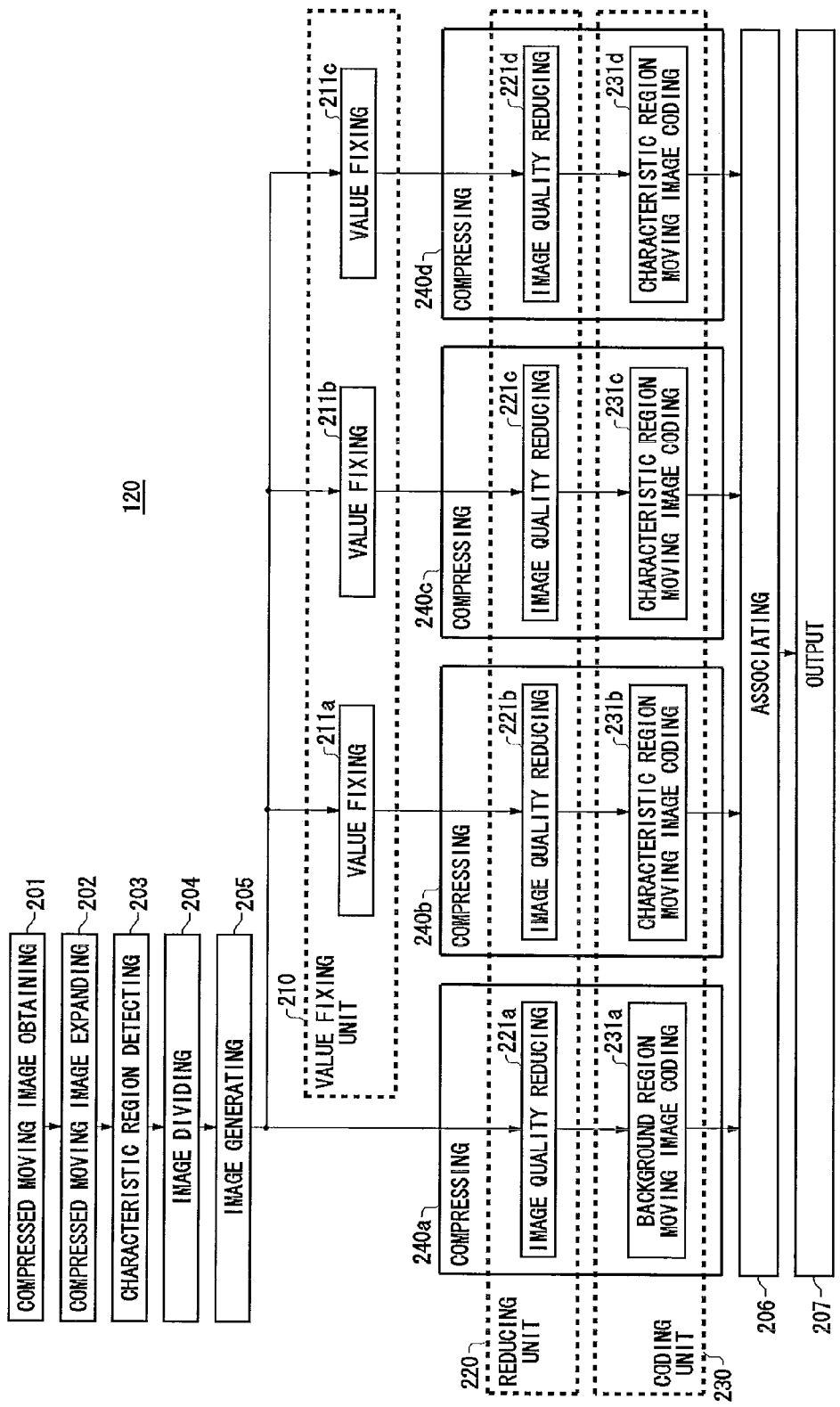
FIG. 2 illustrates an exemplary block configuration of an image processing apparatus 120.

FIG. 2 illustrates an exemplary block configuration of the image processing apparatus 120. The image processing apparatus 120 includes a compressed moving image obtaining section 201, a compressed moving image expanding section 202, a characteristic region detecting section 203, an image dividing section 204, an image generating section 205, a value fixing unit 210, a reducing unit 220, a coding unit 230, an associating section 206, and an output section 207.

The value fixing unit 210 includes a plurality of value fixing sections 211a to 211c (hereinafter collectively referred to as the value fixing section 211). The reducing unit 220 includes a plurality of image quality reducing sections 221a to 221d (hereinafter collectively referred to as the image quality reducing section 221).

The coding unit 230 includes a background region moving image coding section 231a and a plurality of characteristic region moving image coding sections 231b to 231d (hereinafter collectively referred to as the characteristic region moving image coding section 231). Here, the background region moving image coding section 231a and the characteristic region moving image coding sections 231b to 231d may be collectively referred to as the coding section 231.

The image quality reducing section 221a and the background region moving image coding section 231a together function as a compressing section 240a. The image quality reducing section 221b and the characteristic region moving image coding section 231b together function as a compressing section 240b. The image quality reducing section 221c and the characteristic region moving image coding section 231c together function as a compressing section 240c. The image quality reducing section 221d and the characteristic region moving image coding section 231d together function as a compressing section 240d. These compressing sections 240a to 240d are collectively referred to as the compressing section 240.

The compressed moving image obtaining section 201 obtains a compressed moving image. Specifically speaking, the compressed moving image obtaining section 201 obtains the captured moving image data which is generated by the image capturing apparatus 100. The compressed moving image expanding section 202 decompresses the moving image obtained by the compressed moving image obtaining section 201, to generate the moving-image-component images included in the moving image. Specifically speaking, the compressed moving image expanding section 202 decodes the captured moving image data obtained by the compressed moving image obtaining section 201, to generate the moving-image-component images included in the moving image. The moving-image-component images may be frame images, field images or the like.

The characteristic region detecting section 203 detects characteristic regions in the moving-image-component images included in the moving image. The image dividing section 204 divides each of the moving-image-component images into the characteristic regions and a background region.

The image generating section 205 extracts characteristic region images from the moving-image-component images, to generate a plurality of characteristic region compression moving images. Here, each characteristic region compression moving image includes a plurality of characteristic region images. Specifically speaking, the image generating section 205 generates a plurality of characteristic region compression moving images used for compressing a plurality of characteristic region moving images and a background region compression moving image used for compressing a background region moving image, by duplicating the moving image.

The value fixing section 211 sets, at a fixed value, the pixel values of a region other than the characteristic region (hereinafter referred to as a non-characteristic region) in the moving-image-component images included in each of the characteristic region compression moving images. For example, the value fixing section 211 sets, at a predetermined value, the pixel values of the non-characteristic regions of the characteristic region compression moving images (for example, sets the luminance values at zero). The compressing section 240 then compresses each of the characteristic region compression moving images, which includes the moving-image-component images in which the pixel values of the non-characteristic region are set at the fixed value, at the strength determined according to the character information of the characteristic region compression moving image. As described, the compressing section 240 individually compresses the characteristic region compression moving images and the background region compression moving image, at the strengths determined according to the pieces of character information of the compression moving images.

As explained in the above, the characteristic region detecting section 203 detects the characteristic regions in the images. The image dividing section 204 divides each image into the characteristic regions and the background region. The compressing section 240 compresses the characteristic region images showing the characteristic regions and the background region image showing the background region, individually at different strengths. The compressing section 240 compresses the characteristic region moving images each including a plurality of characteristic region images and the background region moving image including a plurality of background region images, respectively at different strengths.

Each of the compressing sections 240b, 240c and 240d is configured to compress a characteristic region moving image of a predetermined type. Each of the compressing sections 240b, 240c and 240d compresses a characteristic region moving image showing a character of a predetermined type. Here, the compression strengths at which the characteristic region moving images showing characters of different types are compressed are determined in advance in association with the types of the characters. Each of the compressing sections 240b, 240c and 240d compresses a characteristic region moving image showing a predetermined type of character at a predetermined compression strength associated with the predetermined type of character. In this manner, the compressing section 240 uses compressors provided in a one-to-one correspondence with the image regions defined by the image dividing section 204, so as to compress a plurality of regions in parallel.

The compressing section 240 may be implemented by a single compressor. In this case, the compressing section 240 may sequentially in time compress the characteristic region moving images and the background region moving image. Alternatively, the compressing section 240 may compress the captured moving image obtained by the decoding operation of the compressed moving image expanding section 202, by compressing the regions defined by the image dividing section 204 at the compression rates determined in advance for the character types and the background of the regions. In this manner, the compressing section 240 may generate a single piece of moving image data.

Note that the characteristic region detecting section 203 detects a plurality of characteristic regions with different types of characters in a plurality of moving-image-component images included in a moving image. The image dividing section 204 divides each of the moving-image-component images into a plurality of characteristic regions and a background region. The compressing section 240 compresses a plurality of characteristic region moving images and a background region moving image respectively at the strengths determined in accordance with the pieces of character information of the moving images. Here, the character information herein indicates any one of the type of the subject, the size of the subject, the moving speed of the moving article, and the size of the characteristic region.

Specifically speaking, the image quality reducing section 221 compresses the characteristic region moving images and the background region moving image by reducing their image qualities according to their respective pieces of character information. In more details, the image quality reducing section 221 compresses the characteristic region moving images and the background region moving image by reducing the resolutions or frame rates according to their respective pieces of character information. The coding section 231 compresses the characteristic region moving images and the background region moving image by coding the moving images with the use of values set according to their respective pieces of character information. For example, the coding section 231 compresses the characteristic region moving images and the background region moving image by coding the moving images with the use of code amounts assigned according to their respective pieces of character information.

The associating section 206 associates, with each other, a plurality of pieces of characteristic region moving image data and a piece of background region moving image data which are generated by the plurality of compressing sections 240 by compressing the characteristic region moving images and the background region moving image. This association is achieved, for example, by adding tag information. The output section 207 transmits the pieces of characteristic region moving image data and the piece of background region moving image data, which are associated with each other by the associating section 206, to the communication network 110.

According to the configuration shown in FIG. 2, the compressing sections 240 included in the image processing apparatus 120 compress the characteristic region images and the background region image in a one-to-one correspondence. According to a different configuration, however, the image processing apparatus 120 may include a single compressing section 240, which may compress the characteristic region images and the background region image respectively at different strengths. For example, the characteristic region images and the background region image may be sequentially supplied to the single compressing section 240 in a time-sharing manner, and the single compressing section 240 may sequentially compress the characteristic region images and the background region image respectively at the different strengths.

Alternatively, the single compressing section 240 may compress the characteristic region images and the background region image respectively at different strengths by quantizing a plurality of pieces of image information of the characteristic regions and a piece of image information of the background region respectively with different quantization coefficients. Furthermore, the characteristic region images and the background region image may be converted into images with different image qualities, and the resulting images may be supplied to the single compressing section 240. The single compressing section 240 may respectively compress the supplied images which are obtained from the characteristic region images and the background region image.

In the above-mentioned embodiments where the single compressing section 240 quantizes the image of each region with a different quantization coefficient or compresses the image of each region having a different image quality, the single compressing section 240 may compress a single entire image or each of the partial regions of an image which are defined by the image dividing section 204 as described with reference to FIG. 2. When the single compressing section 240 compresses a single entire image, the image dividing operation by the image dividing section 204 and the value fixing operation by the value fixing section 211 are not necessary. Thus, the image processing apparatus 120 may be configured without the image dividing section 204 and the value fixing unit 210.

Figure 3:
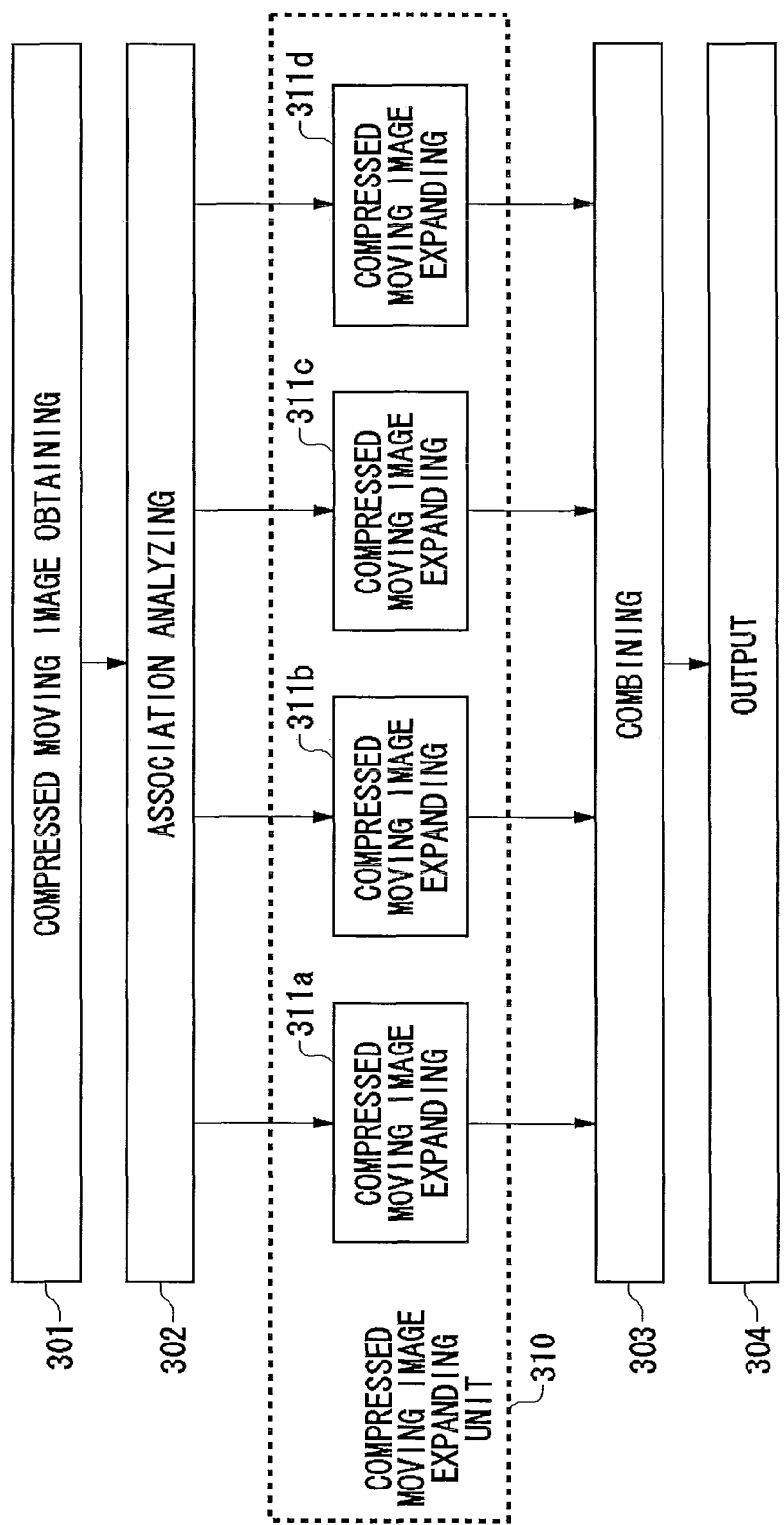
FIG. 3 illustrates an exemplary block configuration of an image processing apparatus 170.

FIG. 3 illustrates an exemplary block configuration of the image processing apparatus 170. The image processing apparatus 170 includes a compressed moving image obtaining section 301, an association analyzing section 302, a compressed moving image expanding unit 310, a combining section 303, and an output section 304. The compressed moving image expanding unit 310 includes a plurality of compressed moving image expanding sections 311a to 311d (hereinafter collectively referred to as the compressed moving image expanding section 311).

The compressed moving image obtaining section 301 obtains the pieces of characteristic region moving image data and the piece of background region moving image data, which are associated with each other, output from the output section 207. The association analyzing section 302, for example, analyzes the added tag information, to retrieve the pieces of characteristic region moving image data and the piece of background region moving image data, which are associated with each other, obtained by the compressed moving image obtaining section 301.

The compressed moving image expanding section 311 decodes the pieces of characteristic region moving image data and the piece of background region moving image data. Specifically speaking, the compressed moving image expanding section 311a decodes the background region moving image data. Each of the compressed moving image expanding sections 311b-311d decodes one of the pieces of characteristic region moving image data. In this way, the compressed moving image expanding sections 311a to 311d obtain a background region moving image and a plurality of characteristic region moving images. Here, the compressed moving image expanding sections 311b to 311d are provided in a one-to-one correspondence with a plurality of characters of different types, and each of the compressed moving image expanding sections 311b to 311d decodes a piece of characteristic region moving image data of one of the types.

The combining section 303 combines together the moving-image-component images obtained by the decoding operation of the compressed moving image expanding section 311. Specifically speaking, the combining section 303 generates moving-image-component images by overlapping the moving-image-component images included in the characteristic region moving images resulting from the decoding operations of the compressed moving image expanding sections 311b to 311d onto the moving-image-component images included in the background region moving image. The output section 304 supplies the moving image including the moving-image-component images generated by the combining section 303, to the display apparatus 180. Here, the output section 304 may record the moving image including the moving-image-component images generated by the combining section 303, onto the image database 175. The image processing apparatus 170 may record the pieces of characteristic region moving image data and the piece of background region moving image data in association with each other which are output from the output section 207, onto the image database 175. In this case, the compressed moving image obtaining section 301 may obtain the pieces of characteristic region moving image data and the piece of background region moving image data in association with each other from the image database 175.

According to the present embodiment, the compressed moving image expanding unit 310 includes a plurality of compressed moving image expanding sections 311 whose number corresponds to the number of the types of characters. In other embodiments, however, the compressed moving image expanding unit 310 may include a single compressed moving image expanding section 311, and the single compressed moving image expanding section 311 may sequentially decode the piece of background region moving image data and the pieces of characteristic region moving image data. When the image processing apparatus 120 provides a single piece of moving image data to the image processing apparatus 170, the single compressed moving image expanding section 311 may decode the provided single piece of moving image data, and the output section 304 may output the moving image obtained by the decoding operation.

Figure 4:
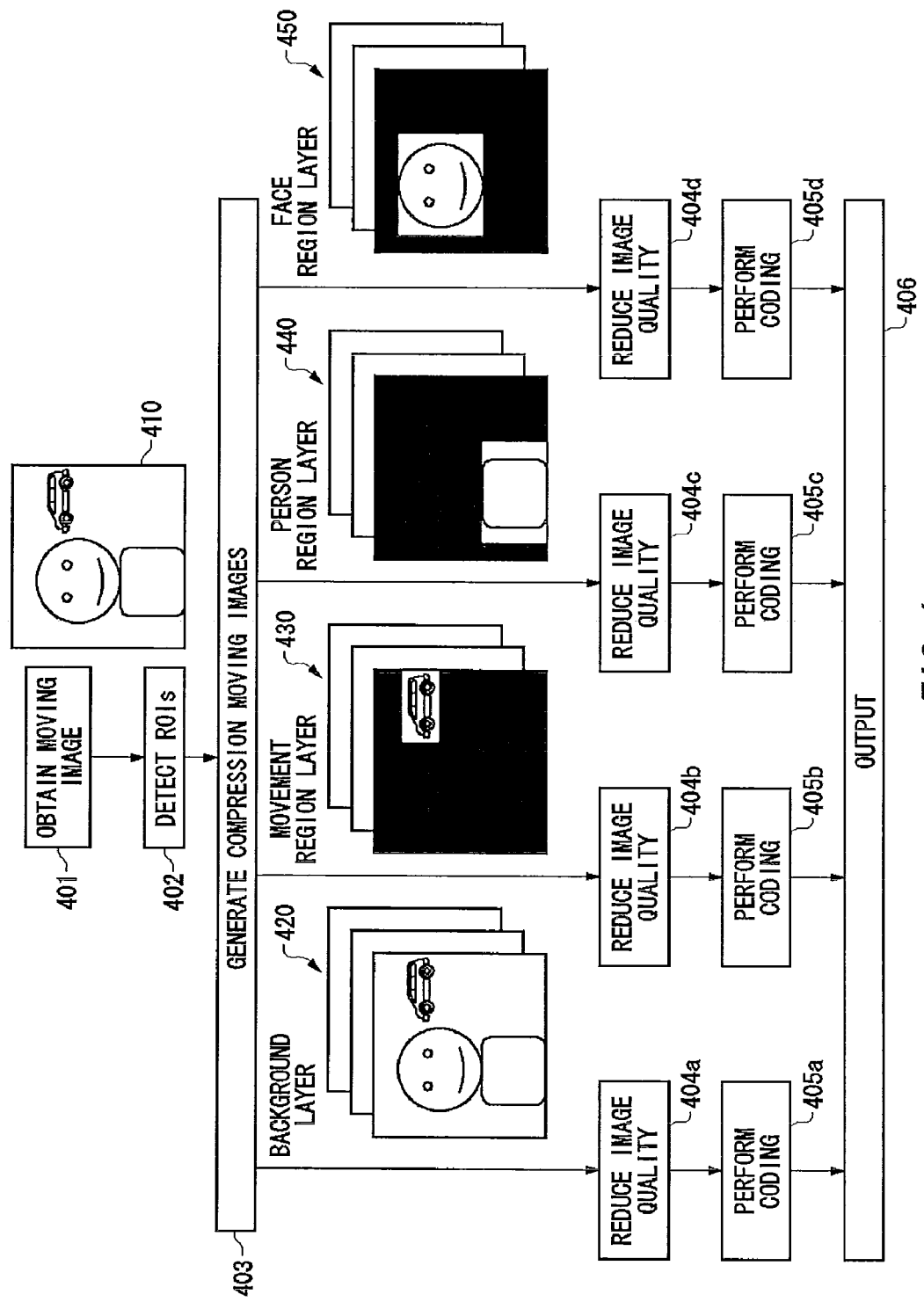
FIG. 4 illustrates an exemplary flow of the operations performed by the image processing apparatus 120.

FIG. 4 illustrates an exemplary flow of the operations performed by the image processing apparatus 120. The compressed moving image obtaining section 201 obtains the captured moving image data in the step 401. The compressed moving image expanding section 202 generates a plurality of frame images 410 by decoding the captured moving image data. The characteristic region detecting section 203 detects regions of interest (ROIs), which are shown as an example of the characteristic regions, based on what is shown by each frame image 410 or the frame images 410 in the step 402.

The characteristic region detecting section 203 detects regions containing a person's face, a person's body, and a moving article, as ROIs of different types. For example, the characteristic region detecting section 203 detects a region containing an object that matches a predetermined pattern of a person's face at a degree higher than a predetermined degree of match by way of the pattern matching technique or the like, and designates the detected face region as a ROI. Furthermore, the characteristic region detecting section 203 detects a body region containing an object that matches a pattern of a person's body is higher than a predetermined degree of match by way of the pattern matching technique or the like, and designates the detected region as a ROI. Here, the characteristic region detecting section 203 may detect the body region in the vicinity of the face region.

The characteristic region detecting section 203 identifies a movement region containing a moving article based on what is shown by the plurality of frame images. For example, the characteristic region detecting section 203 identifies, as the movement region, a region in which the pixel values change between frame images more than a predetermined value. Furthermore, the characteristic region detecting section 203 extracts objects from the frame images by using the edge extraction technique or the like. The characteristic region detecting section 203 may subsequently identify objects that match each other at a higher degree than a predetermined degree of match and are positioned differently in different frame images and identify a region containing the identified objects as a movement region.

As stated above, the characteristic region detecting section 203 detects a region satisfying a predetermined condition relating to image contents, as a ROI. Specifically speaking, the characteristic region detecting section 203 detects a region containing an object satisfying a predetermined condition, as a ROI. For example, the characteristic region detecting section 203 detects, as a ROI, a region containing an object which matches a predetermined shape at a higher degree than a predetermined degree of match. Furthermore, the characteristic region detecting section 203 detects, as a ROI, a region in which the image changes more significantly than a predetermined change. For example, the characteristic region detecting section 203 detects, as a ROI, a region in which the pixel values change between frame images more than a predetermined change.

The characteristic region detecting section 203 can detect, as a ROI, a region that shows a portion of a person's head, a portion of a person's body such as a hand, or at least a portion of a living object other than a person, in addition to the person's face and the person's body listed above. Note that the living object includes particular tissues within the living object, for example, a tumor tissue or blood vessel. In addition, the characteristic region detecting section 203 may detect, as a ROI, a region that shows money, a card such as a cash card, a vehicle, or a license plate of a vehicle, apart from the living object.

Other than the pattern matching technique including the template matching, the characteristic region detecting section 203 may use the result of machine learning (for example, adaboost) disclosed in, for example, Japanese Patent Application Publication No. 2007-188419 in order to detect a ROI. For example, the characteristic region detecting section 203 learns the distinctiveness of the image character information extracted from the image of a predetermined subject, based on the image character information extracted from the image of the predetermined subject and the image character information extracted from the image of a subject different from the predetermined subject. The characteristic region detecting section 203 may detect, as a ROI, a region from which the image character information that has the distinctiveness matching the learned distinctiveness is extracted. In this manner, the characteristic region detecting section 203 can detect, as a ROI, a region showing the predetermined subject. The characteristic region detecting section 203 may detect a ROI which has any shape, for example, a rectangular shape.

The characteristic region detecting section 203 may detect a ROI by using the method disclosed in Japanese Patent Application No. 2008-078641. For example, the characteristic region detecting section 203 discards some of the pixels of a captured image in which an object is to be detected at a single predetermined rate or at predetermined rates. In this manner, the characteristic region detecting section 203 generates an image group composed of the captured image and one or more pixel-discarded images. The characteristic region detecting section 203 applies a first filter to a first image, to calculate an evaluation value. Here, the first image has a relatively small size among the images included in the generated image group, and the first filter acts on a two-dimensional region on the image and generates the evaluation value representing the likelihood that an object of a particular type is present within the region. The first filter may be selected from a group of filters which respectively act on regions of different sizes, and be designed to act on a relatively small region, where each filter has a predetermined number of pixels in accordance with the size of the region on the image. The characteristic region detecting section 203 extracts, from the first image, a primary candidate region which produces an evaluation value exceeding a predetermined first threshold value.

The characteristic region detecting section 203 then applies a second filter to a region corresponding to the primary candidate region in a second image to calculate an evaluation value, where the second image has more pixels by a predetermined number than the first image and the second filter is selected from the group of filters and designed to act on a larger region by a predetermined size than the first filter is. In this manner, the characteristic region detecting section 203 extracts a secondary candidate region which produces an evaluation value exceeding a predetermined second threshold value.

The characteristic region detecting section 203 applies the above-mentioned group of filters that are designed to act on regions of different sizes to the regions of corresponding sizes included in the group of images, to repeat the above-described extracting operation of extracting the candidate region. Here, the characteristic region detecting section 203 repeatedly performs the extracting operations in such a manner as to start from an extracting operation of applying a filter that is designed to act on a relatively small region and sequentially increase the size of the region on which the applied filter acts on. Specifically speaking, the characteristic region detecting section 203 repeatedly and sequentially performs the extracting operations in such a manner as to start with an extracting operation of applying a filter that is designed to act on a relatively small region to a relatively small image and to end with an extracting operation of applying a filter that is designed to act on a relatively large region to a relatively large image. The characteristic region detecting section 203 repeatedly performs two or more extracting operations, to extract a final candidate region. In this manner, the characteristic region detecting section 203 detects an object of a particular type. The characteristic region detecting section 203 then detects a region in which the particular type of object is present, as a ROI. As described above, the characteristic region detecting section 203 limits the application of the filters to a region that is extracted in an immediately preceding extracting operation. In other words, the respective extracting operations sequentially judge whether the object is present. As a result, the characteristic region detecting section 203 can accurately detect the ROIs. In addition, since the above-described method uses small images to roughly detect the ROI, the characteristic region detecting section 203 can detect the ROIs within a shorter time.

Alternatively, the characteristic region detecting section 203 may detect a ROI by using the method disclosed in Japanese Patent Application No. 2008-078636. For example, the characteristic region detecting section 203 detects a ROI by means of a plurality of filters, each of which is designed to act on a two-dimensional region having a predetermined size in the captured image and calculates one of the different pieces of character information relating to the outline of and the area occupied by an object of a particular type. Specifically speaking, the characteristic region detecting section 203 applies those filters to a region having a predetermined size on the captured image in which the object is to be detected, to calculate a plurality of pieces of character information. Here, each of the filters is associated with a relation between the character information calculated by the filter and a primary evaluation value representing the likelihood of the presence of the object of the particular type. The characteristic region detecting section 203 refers to such relations and obtains primary evaluation values related to the calculated pieces of character information. The characteristic region detecting section 203 then integrates the primary evaluation values corresponding to the filters, to obtain a secondary evaluation value representing the likelihood that the object of the particular type is present in the region. The characteristic region detecting section 203 compares the secondary evaluation value with a threshold value in order to extract a region which produces a secondary evaluation value exceeding the threshold value and in which the object of the particular type is highly likely to be present. In the above-described manner, the characteristic region detecting section 203 detects the extracted region as a ROI in which the object of the particular type is present. As described above, the characteristic region detecting section 203 combines a plurality of filters that extract pieces of character information relating to a variety of characters of the outline of and the area occupied by an object. Therefore, the characteristic region detecting section 203 can extract the ROIs more accurately when compared with a ROI detecting operation performed only with reference to, for example, the outline shape of an object.

The characteristic region detecting section 203 may combine the methods disclosed in Japanese Patent Application Nos. 2008-078636 and 2008-078641 in order to detect a ROI. Specifically speaking, the filters described above in relation to the method disclosed in Japanese Patent Application No. 2008-078636 may include a plurality of sets of filters, where each set of filters corresponds to a region of a particular size. The filters in each set have a predetermined number of pixels. Each filter may be associated with the above-mentioned relation between the character information and the primary evaluation value. The characteristic region detecting section 203 discards some of the pixels of a captured image in which objects are to be detected at a single predetermined rate, or at predetermined rates. In this manner, the characteristic region detecting section 203 generates an image group composed of the captured image and one or more pixel-discarded images. The characteristic region detecting section 203 applies a plurality of first filters to a first image, to calculate a plurality of pieces of character information. Here, the first image has a relatively small size among the images included in the image group, and the first filters are designed to act on a relatively small region. Based on the relations respectively associated with the first filters, the characteristic region detecting section 203 obtains primary evaluation values corresponding to the calculated pieces of character information. The characteristic region detecting section 203 then integrates the primary evaluation values to obtain a secondary evaluation value representing the likelihood that an object of a particular type is present in the region. The characteristic region detecting section 203 compares the obtained secondary evaluation value with a first threshold value, in order to extract a primary candidate region which produces a secondary evaluation value exceeding the first threshold value and in which the object of the particular type is highly likely to be present.

The characteristic region detecting section 203 applies a plurality of second filters to a region corresponding to the primary candidate region in a second image, to calculate a plurality of pieces of character information. Here, the second image is included in the image group and has more pixels by a predetermined number than the first image, and the second filters are designed to act on a larger region by a predetermined size than the first filters are. Based on the relations associated with the second filters, the characteristic region detecting section 203 obtains primary evaluation values corresponding to the calculated pieces of character information. The characteristic region detecting section 203 then integrates the primary evaluation values corresponding to the second filters, to obtain a secondary evaluation value representing the likelihood that the object of the particular type is present in the region corresponding to the primary candidate region. The characteristic region detecting section 203 compares the obtained secondary evaluation value with a second threshold value, in order to extract a secondary candidate region which produces a secondary evaluation value exceeding the second threshold value and in which the object of the particular type is highly likely to be present.

The characteristic region detecting section 203 repeatedly performs the extracting operations of extracting the candidate regions, by applying the above-mentioned plurality of sets of filters, where each set is designed to act on a region of a different size, to the regions of correspondingly different sizes in the image group. Here, the characteristic region detecting section 203 repeatedly performs the extracting operations in such a manner as to start from an extracting operation of applying filters that are designed to act on a relatively small region and sequentially increase the size of the region on which the applied filters act on. Specifically speaking, the characteristic region detecting section 203 repeatedly and sequentially performs the extracting operations in such a manner as to start with an extracting operation of applying filters that are designed to act on a relatively small region to a relatively small image and to end with an extracting operation of applying filters that are designed to act on a relatively large region to a relatively large image. The characteristic region detecting section 203 repeatedly performs two or more extracting operations, to extract a final candidate region. In this manner, the characteristic region detecting section 203 detects an object of a particular type. The characteristic region detecting section 203 detects a region in which the object of the particular type is present, as a ROI.

The characteristic region detecting section 203 may detect a ROI by using the method disclosed in Japanese Patent Application No. 2008-098600. For example, the characteristic region detecting section 203 detects a ROI from a plurality of captured images included in the moving images captured by a plurality of image capturing apparatuses 100. For example, it is assumed that the image capturing apparatuses 100a and 100b capture the images of the same scene. For example, the image capturing apparatuses 100a and 100b may serve as a stereo camera. In the following description, an image pair denotes a pair of a first captured image captured by the image capturing apparatus 100a and a second captured image captured by the image capturing apparatus 100b. The characteristic region detecting section 203 detects an object of a particular type in the image pair, and detects a region in which the detected object of the particular type is present as a ROI.

The characteristic region detecting section 203 extracts a region in which the object of the particular type is shown in each of the first and second captured images forming the image pair. Here, the characteristic region detecting section 203 may detect the region in which the object of the particular type is shown at a low accuracy. The characteristic region detecting section 203 then detects the object of the particular type by detecting a pair of corresponding regions from among the extracted regions on the first and second captured images. For example, the characteristic region detecting section 203 calculates the distance from the image capturing apparatuses 100a and 100b to the subject shown in the regions with reference to the images of the pair of regions. The characteristic region detecting section 203 uses the three-dimensional shape of the subject which is obtained based on the distance to the object, in order to detect the object of the particular type.

When detecting the pair of corresponding regions, the characteristic region detecting section 203 divides, into a plurality of sub-regions, each of the regions in which the object of the particular type is shown, which are detected from the first and second captured images forming the image pair. The characteristic region detecting section 203 calculates character information characterizing a partial image in each sub-region, and then calculates a vector representing the pieces of character information of the sub-regions. Here, the character information can be exemplified by pixel values, and the vector can be exemplified by a gradient vector (for example, a pixel value gradient vector). The characteristic region detecting section 203 calculates a logical distance between the calculated vector of the region on the first image and the calculated vector of the region on the second image. The characteristic region detecting section 203 detects, as the pair of corresponding regions, a pair of regions which have a shorter logical distance therebetween than a predetermined value. Here, the logical distance may be exemplified by a square-root of sums of squares of the differences between the components of the vectors. In the above manner, the characteristic region detecting section 203 can accurately extract the pair of corresponding regions from the image pair, thereby accurately calculating the distance to the subject. As a result, the characteristic region detecting section 203 can accurately recognize the three-dimensional shape of the subject, and thus can accurately detect the object of the particular type.

The characteristic region detecting section 203 may detect a ROI by using the method disclosed in Japanese Patent Application No. 2008-091562. For example, the characteristic region detecting section 203 extracts a subject-similar shape similar to a subject of a particular type from each of the captured images included in a moving image, along with the dimensions of the subject-similar shape and the position information of the subject-similar shape in the view angle of the image capturing apparatus 100. The position information in the view angle can be exemplified by the position in the image region within the captured image. The characteristic region detecting section 203 judges whether the extracted subject-similar shape represents the subject of the particular type, and then extracts the subject of the particular type. For example, the characteristic region detecting section 203 may count the number of subjects with the subject-similar shape which have the same dimensions as the extracted subject-similar shape in a predetermined search region including the subject with the subject-similar shape, and extract the subject with the subject-similar shape as the subject of the particular type when the counted number is more than or equal to a threshold value. The characteristic region detecting section 203 may detect, as a ROI, the region containing the subject of the particular type. In this manner, the characteristic region detecting section 203 can detect, as the subject of the particular type, a subject having a subject-similar shape that is present in the image region within which a large number of subjects having dimensions similar to predetermined dimensions are detected. Here, the characteristic region detecting section 203 can be prevented from detecting, as the subject of the particular type, a subject having the subject-similar shape that is present in a different region than this image region. As a result, the characteristic region detecting section 203 can be configured so as to be less likely to mistakenly detect, as the subject of the particular type, subjects having the subject-similar shape that are present in the different region than the above image region.

When the image capturing apparatus 100 has a variable view angle, the above-mentioned position information in the view angle may be exemplified by the direction in which the image capturing apparatus 100 faces when capturing images and the position on the captured image. When a plurality of image capturing apparatuses 100 can be used to capture images of a larger continuous field than when a single image capturing apparatus 100 is used, the above-mentioned position information in the view angle can be exemplified by the directions in which the respective image capturing apparatuses 100 face when capturing images and the positions on the captured images respectively captured by the image capturing apparatuses 100.

Based on the ROIs detected in the above-described manners, the image processing apparatus 120 generates compression moving images in the step 403. Specifically speaking, the image dividing section 204 divides each frame image into the ROIs and the remaining region. Subsequently, the image generating section 205 generates a characteristic region moving image 430, a characteristic region moving image 440, a characteristic region moving image 450 and a background region moving image 420, by duplicating the frame images 410. Specifically speaking, the image generating section 205 generates the characteristic region moving image 450 for the face region, the characteristic region moving image 440 for the person region, the characteristic region moving image 430 for the movement region and the background region moving image 420 for the background region, by duplicating the frame images 410.

The image processing apparatus 120 then uses the value fixing section 211 and the image quality reducing section 221, in order to reduce the image qualities of the characteristic region moving images 430, 440 and 450 and the background region moving image 420 in the steps 404a, 404b, 404c and 404d. Specifically speaking, in the frame image included in each of the characteristic region moving images 430, 440 and 450, the value fixing section 211 maintains the pixel values in the corresponding one of the ROIs defined by the image dividing section 204 and sets the pixel values in the region other than the corresponding ROI at a predetermined value (for example, set the luminance values at zero). Here, the value fixing section 211 may set the pixel values in the region other than the ROI at an average pixel value of the region neighboring the ROI.

In the above-described manner, the image generating section 205 and the value fixing section 211 generate the characteristic region moving images 430, 440 and 450 and the background region moving image 420 each of which includes a plurality of frame images having the same view angle. As described in detail later, the image processing apparatus 170 generates a moving image by overlapping, onto the background region moving image 420, moving images in which the values in the non-ROI regions are set at a fixed value, for example, the characteristic region moving images 430, 440 and 450. Hence, the background region moving image 420 and the characteristic region moving images 430, 440 and 450 can be respectively treated as a background layer, a movement region layer, a person region layer, and a face region layer.

In the frame image included in each of the characteristic region moving images 430, 440 and 450, the image quality reducing section 221 reduces the image quality of the image in the ROI according to the type of the character. Specifically speaking, the image qualities of the face, person and movement regions are defined in advance by at least one of the parameters including the resolution, the number of gray levels, and the number of colors. For example, it is designated in advance that the face, person and movement regions are arranged in the descending order of resolution.

The image quality reducing section 221 changes the image of the ROI in the frame image included in each of the characteristic region moving images 430, 440 and 450, into an image having predetermined resolution, number of gray levels and number of colors, in accordance with the type of the character. The image quality reducing section 221 also sets the image quality of the frame image included in the background region moving image so as to be lower than the image qualities of the images in the ROIs. For example, the image quality reducing section 221 sets the resolution of the frame image included in the background region moving image so as to be lower than the resolutions of the images in the ROIs.

The image quality reducing section 221 reduces the frame rates of the background region moving image 420 and the characteristic region moving images 430, 440 and 450. For example, each type of character, that is to say, each of the face, person and movement regions is associated with a predetermined frame rate. The image quality reducing section 221 reduces the frame rate of each of the characteristic region moving images 430, 440 and 450 by discarding, at predetermined intervals, some of the flame images included in each of the characteristic region moving images 430, 440 and 450 in accordance with the predetermined frame rate associated with the type of character. The image quality reducing section 221 also reduces the frame rate of the background region moving image 420 by discarding some of the frame images included in the background region moving image 420 in accordance with the predetermined frame rate.

Here, the image quality reducing section 221a reduces the image quality of the background region moving image 420. The image quality reducing sections 221b, 221c and 221d respectively reduce the image qualities of the characteristic region moving images 430, 440 and 450.

Subsequently, the background region moving image coding section 231a and the characteristic region moving image coding sections 231b to 231d respectively code the corresponding moving images whose image qualities have been reduced by the image quality reducing section 221, in the steps 405a, 405b, 405c and 405d. For example, the background region moving image coding section 231a and the characteristic region moving image coding sections 231b to 231d MPEG-code the corresponding moving images whose image qualities have been reduced by the image quality reducing section 221.

For example, the background region moving image coding section 231a MPEG-codes the background region moving image in accordance with the coding setting for the background region moving image. The characteristic region moving image coding sections 231b, 231c and 231d respectively MPEG-code the corresponding characteristic region moving images in accordance with the coding settings respectively for the movement, person and face region moving images. Here, the coding setting includes setting a quantization table for MPEG coding, for example. The coding setting is described with reference to FIG. 5.

In the step 406, the associating section 206 associates, to each other, a piece of background region moving image data and a plurality of pieces of characteristic region moving image data which are obtained by the coding operations of the background region moving image coding section 231a and the characteristic region moving image coding sections 231b to 231d, by adding tag information, and the output section 207 outputs the piece of background region moving image data and the pieces of characteristic region moving image data to the image processing apparatus 170. Here, the associating section 206 may add timing information to the tag information, where the timing information is, for example, time stamps and includes information indicating the display timings of the frame images included in the background region moving image and the characteristic region moving images. The associating section 206 may add, to the tag information, characteristic region information indicating the range of each characteristic region, identification information identifying the image capturing apparatus 100 which has generated the captured moving image data from which the background region moving image and the characteristic region moving images are generated, and other information.

As described above, the characteristic region detecting section 203 detects a plurality of characteristic regions showing different types of subjects, from a plurality of moving-image-component images included in a moving image. The compressing section 240 compresses a plurality of characteristic region moving images respectively at strengths determined in accordance with the types of the subjects. In the present embodiment, the different types of subjects include, for example, a person's face and a person's body. In other embodiments, however, the different types of subjects may include the license plate of an automobile and a different part of an automobile than the license plate.

The different types of subjects may include front and side views of a person's face. The different types of subjects may include stationary and moving subjects. The characteristic region detecting section 203 may detect, as a plurality of characteristic regions with different types of characters, a plurality of regions containing a plurality of subjects which are positioned away from the image capturing apparatus 100 by different distances.

The compression strengths at which the compressing section 240 compresses the characteristic region moving images may descend in the order of a movement region, a person's body, the side view of a person's face, and the front view of a person's face, which are exemplary characters of different types. Since the image processing system 10 is used as a monitoring system in the present embodiment, the image processing system 10 is configured to detect a region containing a person's face as a ROI and set the image quality of the detected ROI higher than the image quality of the non-ROI region. The image processing system 10, however, can be used for capturing images of a street, for example. When used for such a purpose, the image processing system 10 may detect a region containing a person's face as a ROI and set the image quality of the detected ROI lower than the image quality of the non-ROI region in order to protect personal information. For example, the compression strengths at which the compressing section 240 compresses the characteristic region moving images and the background region moving image may descend in the order of the front view of a person's face, the side view of a person's face, a person's body, a movement region and a background region.

The characteristic region detecting section 203 may detect a plurality of characteristic regions containing subjects that move at different speeds, from a plurality of frame images. In this case, as the speeds of the subjects increase, the frame rates of the moving images obtained by the image quality reducing section 221 by converting the characteristic region moving images increase. Which is to say, the compressing section 240 may compress the characteristic region moving images respectively at strengths determined in accordance with the speeds of their subjects.

As described above, the image processing apparatus 120 sets, at fixed values, the values in the non-ROI regions in the frame images respectively included in the characteristic region moving images, and generates a plurality of characteristic region moving images and a background region moving image which all have the same view angle. Therefore, the image processing apparatus 120 may be able to use a general-purpose coder for compressing the characteristic region moving images at high compression rates without using a specially designed coder. For example, when the characteristic region moving images are coded by way of motion vectors as in the MPEG coding technique, the pixel values may often have a differential value of 0 in the macroblocks within the non-ROI region whose values are set at a fixed value. As a result, the above-mentioned value fixing operation may be able to lower the manufacturing cost of the image processing apparatus 120 with it being possible to maintain high compression rates.

In the above description, the compressing section 240 compresses the characteristic region moving images including the frame images in which the values in the non-ROI regions are set at fixed values. The compressing section 240 may clip the images within the ROIs from the frame images included in the characteristic region moving images, compress the clipped images, and output the compressed images as the characteristic region moving images.

When the characteristic region detecting section 203 detects no ROIs, the output section 207 outputs the background region moving image data output from the compressing section 240a, to the image processing apparatus 170. In this case, the image generating section 205 may not need to generate the characteristic region moving images 430, 440 and 450. Under the condition that the characteristic region detecting section 203 detects ROIs, the image generating section 205 generates the characteristic region moving images 430, 440 and 450, and the output section 207 outputs a plurality of pieces of characteristic region moving image data and a piece of background region moving image data, which are obtained in the above-described manner, to the image processing apparatus 170. During this period, the compressing section 240a may continue compressing the background region moving image 420 at a predetermined background region compression rate.

While the characteristic region detecting section 203 detects no ROIs, the compressing section 240 may compress the background region moving image at a predetermined no-ROI compression rate which is lower than the above background region compression rate and higher than the compression rates for the characteristic region moving images. Under the condition that the characteristic region detecting section 203 detects ROIs, the compressing section 240 may compress the background region moving image at the above background region compression rate. Here, the compressing section 240 may compress the characteristic region moving images at compression rates lower than the no-ROI compression rate.

The compressing section 240 may compress the background region moving image at the no-ROI compression rate until a predetermined time period elapses after the characteristic region detecting section 203 detects ROIs, and compress the background region moving image at the background region compression rate after the predetermined time period has elapsed. With such a configuration, even when the characteristic region detecting section 203 does not detect, as a ROI, a region which is originally expected to be detected as a ROI, the image processing apparatus 120 may be able to provide a background region moving image with a reasonably high image quality. The compressing section 240 may compress the respective regions at different compression rates in the following manner. The characteristic region detecting section 203 detects ROIs in the frame images, and the positions of the detected ROIs are used to estimate a ROI in a different frame image. In the different frame image, the region containing the ROI has a higher image quality than the non-ROI region.

Figure 5:
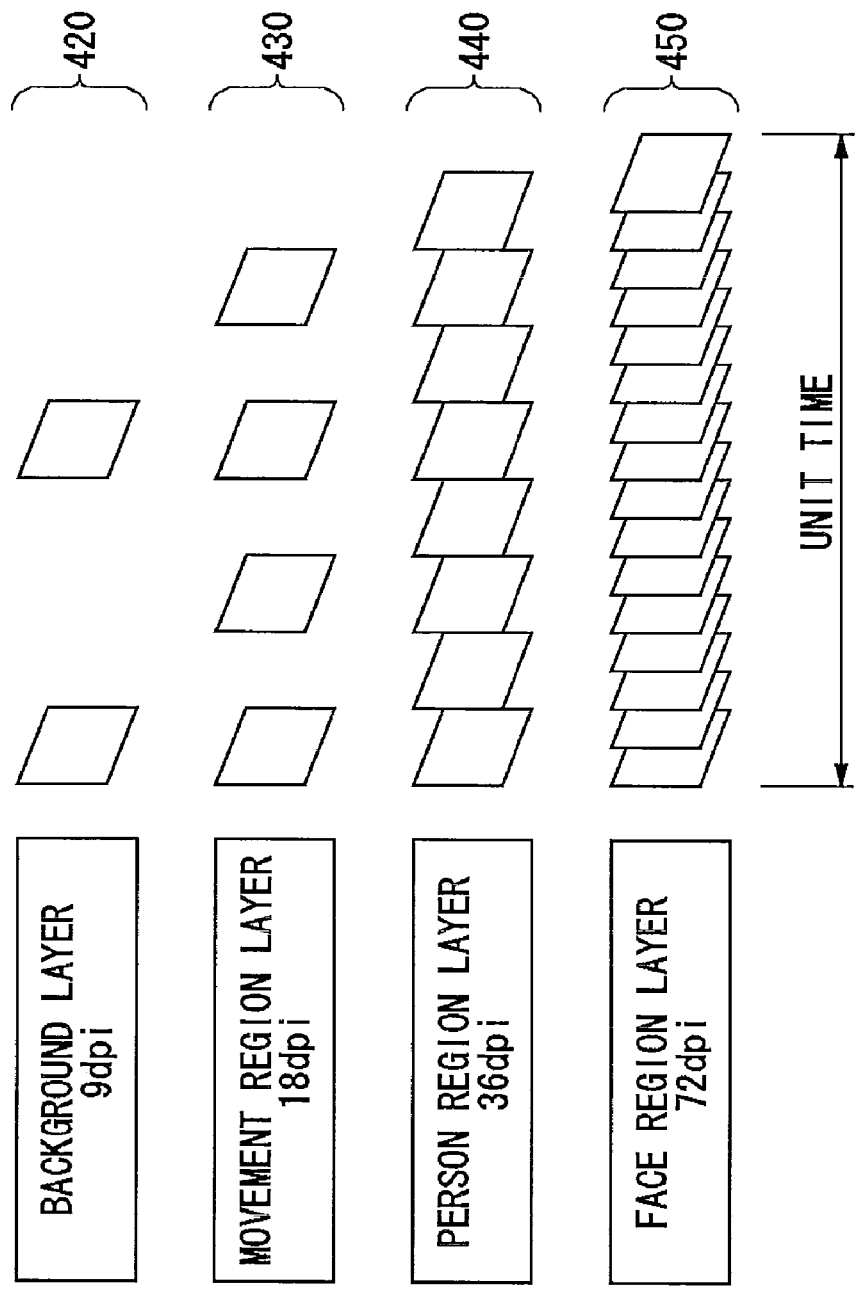
FIG. 5 shows, as an example, the image qualities of characteristic region moving images and the image quality of a background region moving image.

FIG. 5 shows, as an example, the image qualities of the characteristic region moving images and the image quality of the background region moving image. To simplify the explanation, it is assumed that the captured moving image data obtained by the compressed moving image obtaining section 201 has a frame rate of 16 fps and that the frame images included in the captured moving image data have a resolution of 72 dpi.

The resolution ratio of the resolution of the frame image included in the background region moving image 420 after the image-quality reduction to the resolution of the frame image 410 included in the captured moving image is set at ⅛ in advance. The image quality reducing section 221 generates 9-dpi frame images by discarding some of the pixels of the frame images included in the background region moving image 420 before the image-quality reduction, where the resolution of 9 dpi is one-eighth of the resolution of the frame images included in the background region moving image 420 before the image-quality reduction which is generated by the image generating section 205 by duplicating the captured moving image. Furthermore, the frame rate ratio of the frame rate of the background region moving image 420 after the image-quality reduction to the frame rate of the captured moving image is set at ⅛ in advance. The image quality reducing section 221 generates a 2-fps background region moving image 420 by discarding some of the frame images included in the background region moving image 420 before the image-quality reduction, where the frame rate of 2 fps is one-eighth of the frame rate of the background region moving image 420 before the image-quality reduction.

Similarly, the resolution ratios and the frame rate ratios are designated in advance in association with the respective characteristic region moving images. For example, the resolution ratio and the frame rate ratio are set at 1/4 for the characteristic region moving image 430, the resolution ratio and the frame rate ratio are set at 1/2 for the characteristic region moving image 440, and the resolution ratio and the flame rate ratio are set at 1/1 for the characteristic region moving image 450. In this case, the image quality reducing section 221b generates the characteristic region moving image 430 with the frame rate of 4 fps and the frame image resolution of 18 dpi. The image quality reducing section 221c generates the characteristic region moving image 440 with the frame rate of 8 fps and the frame image resolution of 36 dpi. The image quality reducing section 221d generates the characteristic region moving image 450 with the frame rate of 16 fps and the frame image resolution of 72 dpi.

In the above-described exemplary case, the image quality reducing section 221 reduces the image qualities of the frame images by discarding some of the pixels of the frame images included in the characteristic region moving images and the background region moving image. Alternatively, the image quality reducing section 221 may reduce the image qualities of the frame images by using filters each of which passes a predetermined frequency band, for example, low pass filters. If such is the case, the filter associated with each type of character may have predetermined properties, where the different types of characters include the background region, the movement region, the person region, and the face region and the filter properties include the frequency band passing through each filter and the degree of the passage.

In addition to or in place of the image-quality reduction performed by the image quality reducing section 221, the coding section 231 may reduce the image qualities of the frame images. For example, the coding section 231 can reduce the image qualities by increasing the values of the quantization tables used for the MPEG coding. The values of each quantization table may be set in advance in accordance with a corresponding one of the different types of characters. For example, the background region moving image coding section 231a and the characteristic region moving image coding sections 231b to 231d may code the corresponding moving images by using the quantization tables with predetermined values. Referring to the quantization tables, the values are associated with frequency components. Such values may be set in advance differently in accordance with the different types of characters.

The image quality reducing section 221 may also average a plurality of frame images included in the background region moving image. In this way, when an object representing a moving article is included in the frame images, the image quality reducing section 221 can obtain a frame image in which the object representing the moving article is averaged.

When such averaged frame images are successively displayed, a viewer may enjoy watching smooth movement of the moving article.

According to the above-described embodiment, the image generating section 205 duplicates the captured moving image to generate the characteristic region moving images and the background region moving image, and the compressing section 240 compresses the generated characteristic region moving images and background region moving image by discarding some of the frame images and pixels. Alternatively, the image generating section 205 may generate the characteristic region moving images and the background region moving image with lowered frame rates by discarding some of the frame images included in the captured moving image in accordance with the frame rate ratios. After this, the value fixing section 211 performs the value fixing operation, and the image quality reducing section 221 reduces the resolutions to reduce the image qualities of the characteristic region moving images and the background region moving image.

Figure 6:
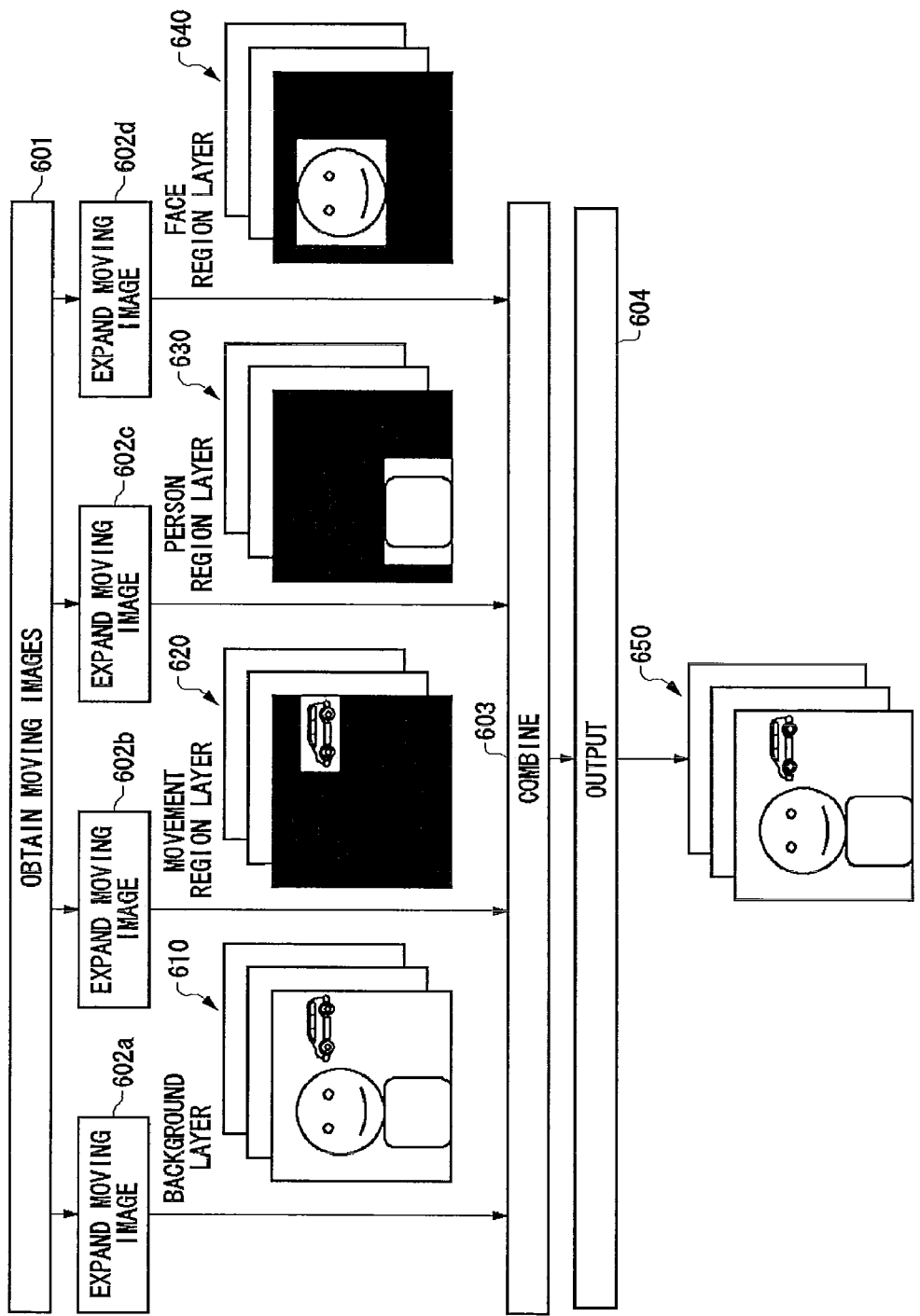
FIG. 6 illustrates an exemplary flow of the operations performed by the image processing apparatus 170.

FIG. 6 illustrates an exemplary flow of the operations performed by the image processing apparatus 170. The compressed moving image obtaining section 301 obtains a plurality of pieces of characteristic region moving image data and a piece of background region moving image data which are associated with each other, from the image processing apparatus 120, and obtains timing information, identification information identifying the image capturing apparatus 100 and other information with reference to the added tag information, in the step 601. The compressed moving image expanding section 311 decodes the pieces of characteristic region moving image data and the piece of background region moving image data, to generate a background region moving image 610 representing a background layer in the step 602a. At the same time, the compressed moving image expanding section 311 generates a characteristic region moving image 620 representing a movement region layer, a characteristic region moving image 630 representing a person region layer, and a characteristic region moving image 640 representing a face region layer in the steps 602b, 602c and 602d.

The combining section 303 combines together the frame images included in the background region moving image 610 and the characteristic region moving images 620, 630 and 640 in the step 603. Here, the combining section 303 enlarges the frame images included in the background region moving image 610 and the characteristic region moving images 620, 630 and 640 in accordance with their respective resolutions in such a manner that the identical subjects in the respective frame images overlap each other, and layers the enlarged frame images to generate a combined frame image.

The combining section 303 clips the images of the characteristic regions from the frame images included in the characteristic region moving images 620, 630, and 640, and overlays the clipped images onto the frame image included in the background region moving image 610. In this manner, the combining section 303 generates the combined frame image. When the background region moving image 610 and the characteristic region moving images 620, 630 and 640 have different frame rates, the combining section 303 combines together the most recent frame images of the background region moving image 610 and the characteristic region moving images 620, 630 and 640.

In the above-described manner, the combining section 303 generates a combined frame image. The combining section 303 further generates a combined moving image 650 including a plurality of combined frame images. The output section 304 selects the display apparatus 180 which is to display the combined moving image with reference to the tag information obtained by the compressed moving image obtaining section 301, and supplies the combined moving image to the selected display apparatus 180 in the step 604.

Figure 7:
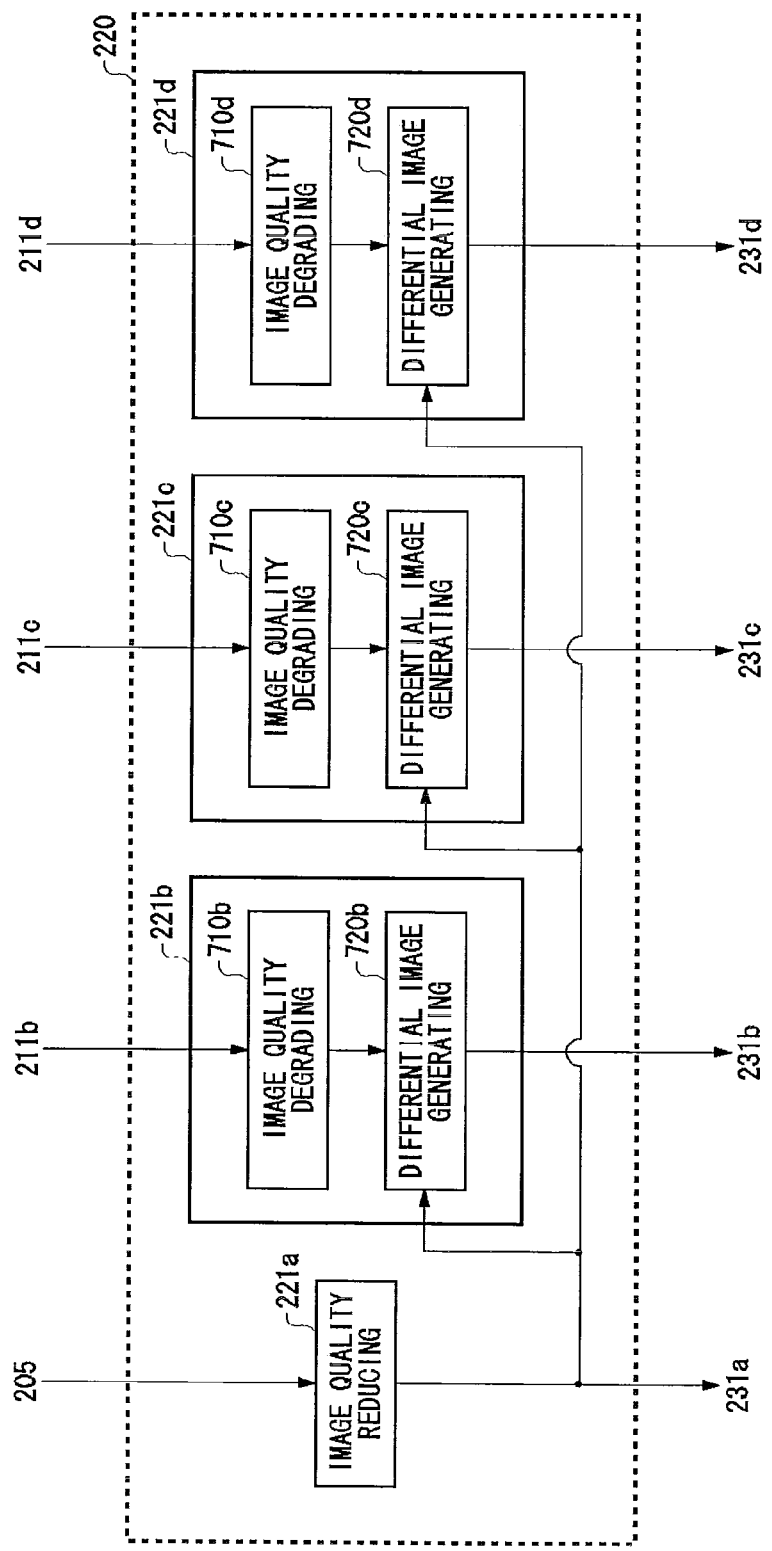
FIG. 7 illustrates an exemplary block configuration of a reducing unit 220.

FIG. 7 illustrates an exemplary block configuration of the reducing unit 220. The image quality reducing section 221b includes an image quality degrading section 710b and a differential image generating section 720b. The image quality reducing section 221c includes an image quality degrading section 710c and a differential image generating section 720c, and the image quality reducing section 221d includes an image quality degrading section 710d and a differential image generating section 720d. The image quality degrading sections 710b to 710d have the same functions and operations, and the differential image generating sections 720b to 720d have the same functions and operations. The image quality degrading sections 710b to 710d may be collectively referred to as the image quality degrading section 710, and the differential image generating sections 720b to 720d may be collectively referred to as the differential image generating section 720.

The image quality reducing section 221a generates a background region image by reducing the image quality of an image of a region containing a non-characteristic region and a characteristic region. Specifically speaking, the image quality reducing section 221a generates the background region image by reducing the resolution of the image of the region containing the non-characteristic region and the characteristic region. Specifically speaking, the image quality reducing section 221a generates the background region image by reducing the resolution, where the resolution reduction is achieved by discarding some of the pixels of the image of the region containing the non-characteristic region and the characteristic region.

Alternatively, the image quality reducing section 221a may generate the background region image by reducing the high frequency components, in the spatial frequency domain, of the image of the region containing the non-characteristic region and the characteristic region. Specifically speaking, the image quality reducing section 221a may generate the background region image by reducing the high frequency components, where the reduction of the high frequency components is achieved by performing a low pass filtering on the image of the region containing the non-characteristic region and the characteristic region. Alternatively, the image quality reducing section 221a may generate the background region image by reducing the high frequency components, where the reduction of the high frequency components is achieved by averaging the pixel values of the image of the region containing the non-characteristic region and the characteristic region.

The image quality degrading section 710 degrades the image quality of the image obtained as a result of the value fixing operation which is performed by the value fixing section 211 in accordance with the character of the characteristic region detected by the characteristic region detecting section 203. The differential image generating section 720 generates a differential image representing the difference between the image of the characteristic region and a low-quality image resulting from degrading the image quality of the image of the characteristic region. Specifically speaking, the differential image generating section 720 generates the differential image representing the difference between the image of the characteristic region and the low-quality image resulting from the image quality degradation by the image quality degrading section 710. More specifically, the differential image generating section 720 generates the differential image representing the difference between the image of the characteristic region within an image and the low-quality image resulting from enlarging the image of the characteristic region whose resolution has been reduced.

Alternatively, the differential image generating section 720 may generate the differential image representing the difference between the image of the characteristic region within an image and the low-quality image obtained by reducing the high frequency components in the spatial frequency domain of the image of the characteristic region. Here, the differential image generating section 720 may generate the differential image representing the difference between the image of the characteristic region within an image and the low-quality image obtained by enlarging the image of the characteristic region in the background region image.

The output section 207 outputs the differential image and the background region image which are associated with each other. The image processing apparatus 170 can restore the characteristic region image based on the differential image and the background region image associated with the differential image. The restoration performed by the image processing apparatus 170 is described later with reference to FIG. 8. As described above, the output section 207 outputs the differential image generated by the differential image generating section 720. Therefore, the amount of the image data transmitted to the image processing apparatus 170 from the output section 207 can be reduced when compared with the case where the output section 207 outputs the image of the characteristic region.

The image quality reducing section 221a may generate the background region image by reducing the resolution of the image of the region containing the non-characteristic region and the characteristic region in at least one of a plurality of moving-image-component images. In this case, the differential image generating section 720 generates a plurality of differential images representing the difference between the low-quality image and a plurality of images of the characteristic region in the moving-image-component images, where the low-quality image is obtained by enlarging the image of the characteristic region in the background region image. The output section 207 outputs the differential images generated by the differential image generating section 720 and the background region image which are associated with each other. Specifically speaking, the output section 207 outputs a characteristic region moving image including a plurality of differential images and a background region moving image including a plurality of background region images which are associated with each other.

The characteristic region detecting section 203 may detect a plurality of characteristic regions with different types of characters, from a plurality of moving-image-component images included in a moving image. In this case, the differential image generating section 720 generates, for each of the characteristic regions with different types of characters, a plurality of differential images representing the difference between the low-quality image obtained by enlarging the image of the characteristic region in the background region image and a plurality of images obtained by degrading the image qualities of the images of the characteristic region in the moving-image-component images in accordance with the information of the character. The output section 207 outputs the differential images generated by the differential image generating section 720 for each type of character and the background region image, which are associated with each other.

Figure 8:
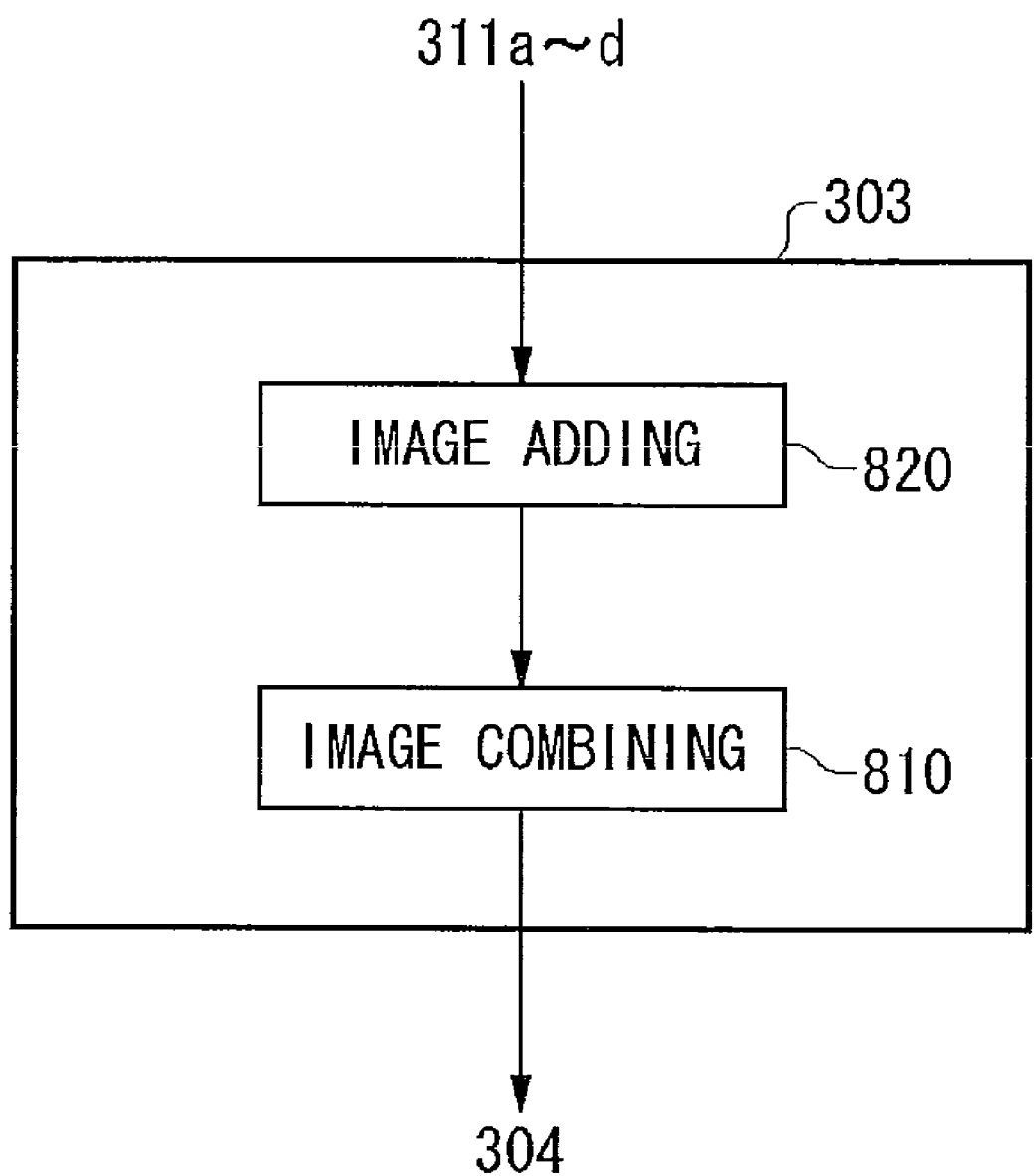
FIG. 8 illustrates an exemplary block configuration of a combining section 303.

FIG. 8 illustrates an exemplary block configuration of the combining section 303. Here, the compressed moving image obtaining section 301 may be shown as an example of an image obtaining section relating to the present invention. The combining section 303 includes an image adding section 820 and an image combining section 810. The compressed moving image obtaining section 301 obtains differential images and background region images. Specifically speaking, the compressed moving image obtaining section 301 obtains moving image data resulting from compressing a characteristic region moving image including a plurality of differential images and moving image data resulting from compressing a background region moving image including a plurality of background region images.

The image adding section 820 adds together the differential images obtained by the compressed moving image obtaining section 301 and the images of the characteristic region in the background region images, to generate addition images. The image combining section 810 combines the addition images and the background region images together. Specifically speaking, the image combining section 810 overlays the addition images onto the background region images. In this manner, the image processing apparatus 170 can restore the images of the characteristic regions based on the differential images.

Figure 9:
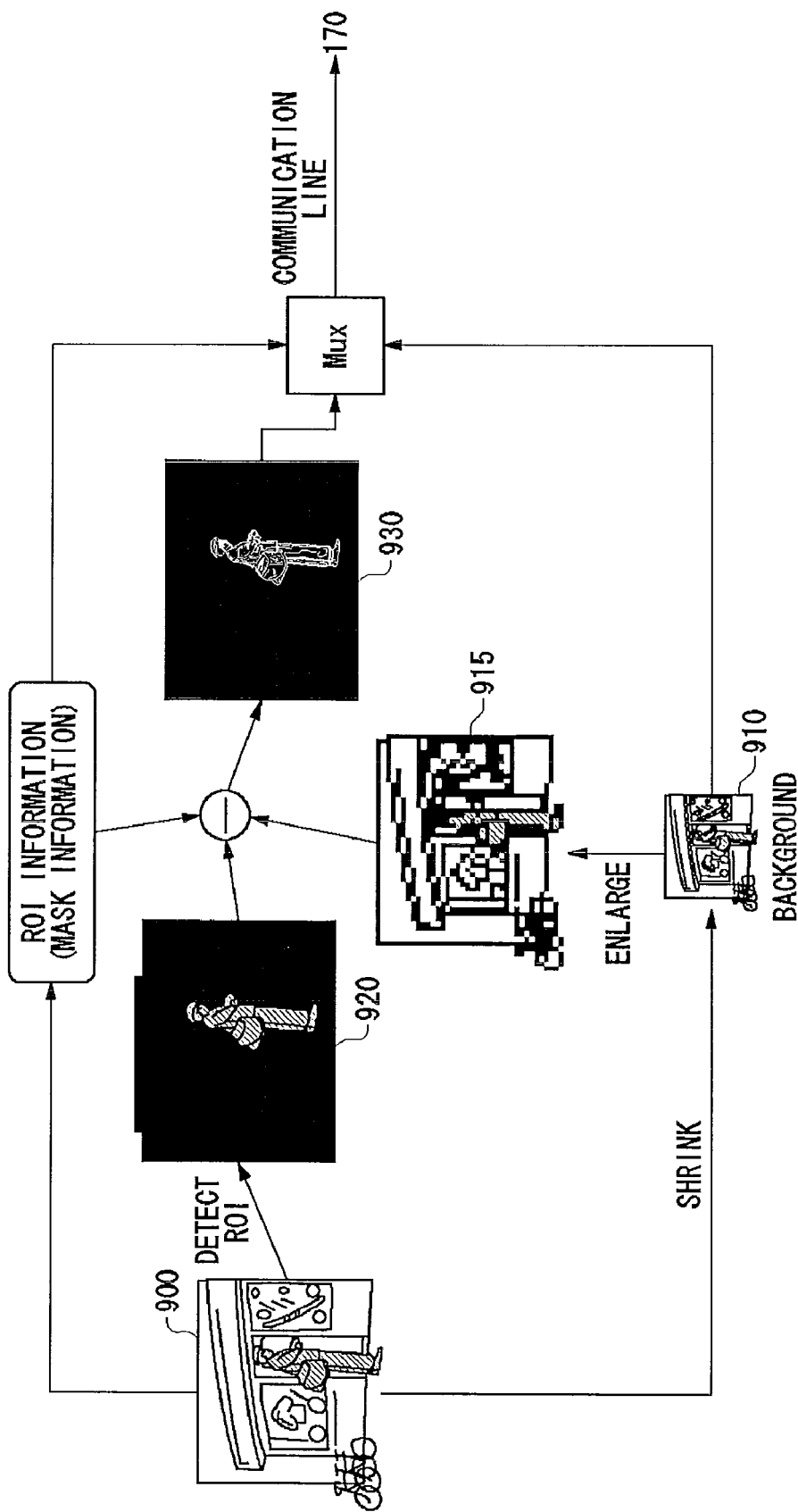
FIG. 9 illustrates an exemplary operation performed by an image quality reducing section 221.

FIG. 9 illustrates an exemplary operation performed by the image quality reducing section 221. The value fixing section 211 sets, at a fixed value, the values of the region other than a ROI detected by the characteristic region detecting section 203 in a frame image duplicated from a flame image 900 obtained by the compressed moving image expanding section 202. The image quality degrading section 710 generates a characteristic region image 920 by reducing the image quality of the image of the ROI in the frame image received from the value fixing section 211 in accordance with the character of the ROI as mentioned above.

The image quality reducing section 221a generates a background region image 910 by discarding some of the pixels of a frame image duplicated from the frame image 900. The differential image generating section 720 generates a low-quality image 915 by enlarging the background region image 910 so as to have the same resolution as the characteristic region image 920. The differential image generating section 720 may generate the low-quality image 915 by simply enlarging the pixels included in the background region image 910. Alternatively, the differential image generating section 720 may generate the low-quality image 915 from the background region image 910 by interpolating the pixels of the background region image 910.

The differential image generating section 720 uses ROI information including the coverage of the ROI detected by the characteristic region detecting section 203, to subtract the image of the characteristic region in the low-quality image 915 from the characteristic region image 920. In this manner, the differential image generating section 720 generates a differential image 930.

The differential image generating section 720 performs the above-described processing respectively on a plurality of flame images, to generate a plurality of differential images 930 and a plurality of background region images 910. The coding section 231 codes the differential images 930 to generate characteristic region moving image data, and codes the background region images 910 to generate background region moving image data. As described earlier, the compressing section 240 generates characteristic region moving image data in association with each type of character, which is to say, generates a plurality of pieces of characteristic region moving image data.

The associating section 206 multiplexes the pieces of characteristic region moving image data, the background region moving image data and the ROI information, to generate moving image data. The output section 207 transmits the moving image data generated by the associating section 206 to the image processing apparatus 170 via the communication network 110. In the above description, the differential image generating section 720 generates the low-quality image 915 by enlarging the background region image 910. The differential image generating section 720, however, may reduce the image quality of the image of the characteristic region in the characteristic region image 920 and use the resulting image of the characteristic region in place of the image of the ROI in the low-quality image 915.

The differential image generating section 720 may generate the low-quality image 915 by enlarging the background region image 910 included in the background region moving image transmitted to the image processing apparatus 170. When the characteristic region moving image and the background region moving image have different frame rates from each other, the differential image generating section 720 may generate the low-quality image 915 from the background region image 910 generated from a frame image captured at a timing closest to the timing at which an original frame image from which the characteristic region image 920 is generated is captured. In this case, the differential image generating section 720 may first change the image of the ROI in the low-quality image 915 in accordance with the change in the image of the ROI across a plurality of characteristic region images, and then calculate the difference between the characteristic region image 920 and the changed low-quality image 915. For example, the differential image generating section 720 may first change the pixel values within the ROI in the low-quality image 915 in accordance with the change in the pixel values within the ROI across a plurality of characteristic region images, and then calculate the difference between the characteristic region image 920 and the changed low-quality image 915. Alternatively, the differential image generating section 720 may first change the facing direction of the person contained in the ROI within the low-quality image 915 in accordance with the change in the facing direction of the person contained in the ROI across a plurality of characteristic region images, and then calculate the difference between the characteristic region image 920 and the changed low-quality image 915.

Figure 10:
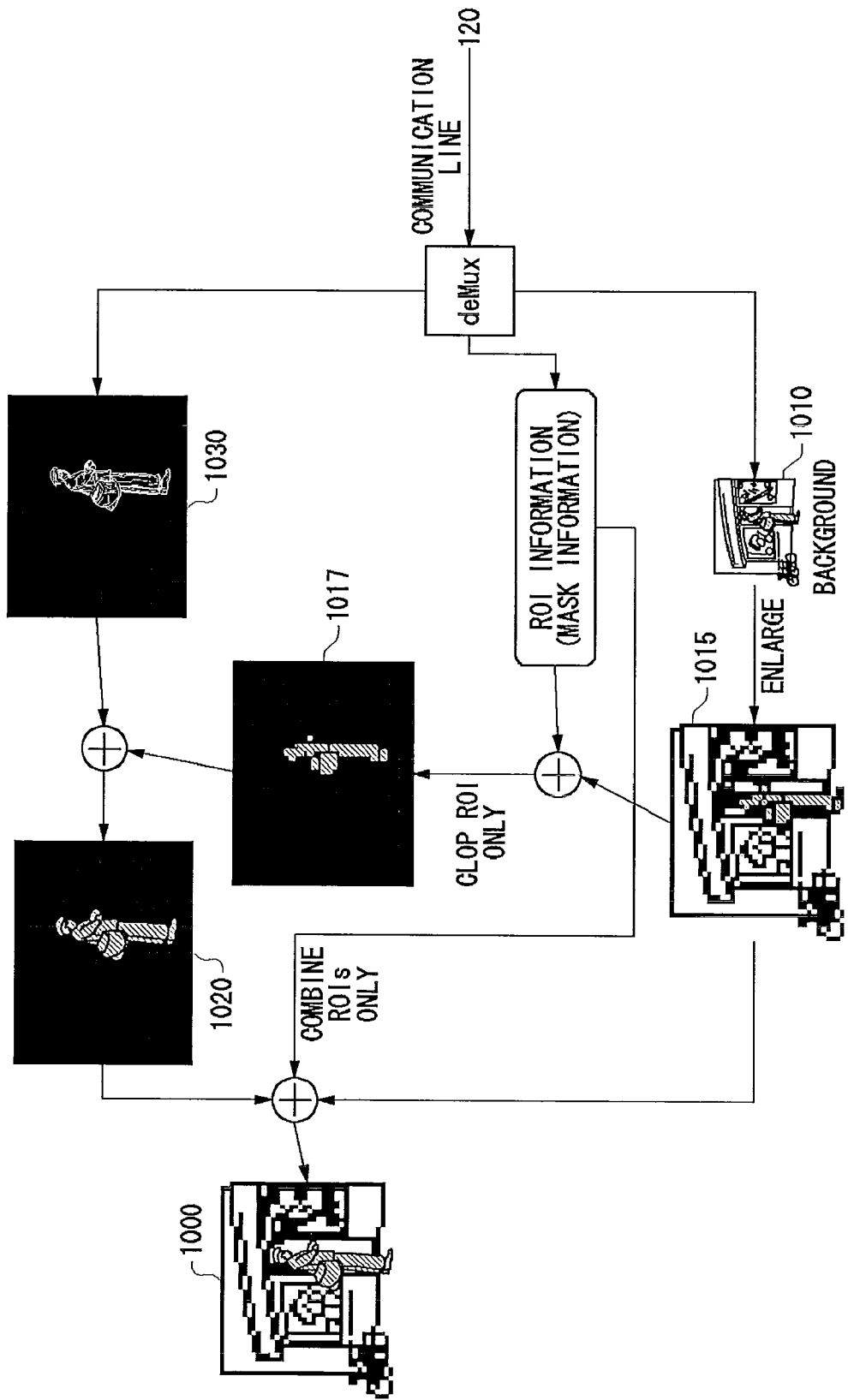
FIG. 10 illustrates an exemplary operation performed by the combining section 303.

FIG. 10 illustrates an exemplary operation performed by the combining section 303. The association analyzing section 302 demultiplexes the moving image data obtained by the compressed moving image obtaining section 301 from the image processing apparatus 120, to retrieve the pieces of characteristic region moving image data, the background region moving image data and the ROI information. The compressed moving image expanding section 311 then extracts a frame image included in each piece of moving image data.

Specifically speaking, the compressed moving image expanding section 311a extracts a background region image 1010 from the background region moving image data. Each of the compressed moving image expanding section 311b to 311d extracts a characteristic region image 1030 from the characteristic region moving image data. Subsequently, the image adding section 820 enlarges the background region image 1010 so as to have the same resolution as the characteristic region image 1030, to generate a low-quality image 1015. The image adding section 820 then adds together the characteristic region image 1030 and a clopped image 1017 obtained by clopping the image within the ROI indicated by the ROI information retrieved by the association analyzing section 302 from the low-quality image 1015, to generate an addition image 1020.

The image combining section 810 subsequently overlays the image of the characteristic region in the addition image 1020 onto the region indicated by the ROI information in the low-quality image 1015, to generate a combined image 1000. Here, the image adding section 820 may generate the addition image 1020 for each type of character. The image combining section 810 may then overlay the addition image 1020 of each type of character onto the low-quality image 1015 in accordance with the corresponding ROI information, to generate the combined image 1000.

As described above, the compressing sections 240b to 240d generate characteristic region moving image data based on the differential image between the characteristic region image and the image of the characteristic region in the background region image. The differential image does not contain a low-frequency image signal, differently from the background region image. Therefore, the image processing apparatus 120 may be able to compress the image within the ROI more efficiently than when the image processing apparatus 120 simply compresses the image within the ROI without changing the image. The image processing apparatus 170 can restore the characteristic region image based on the low-frequency image signal in the image of the characteristic region in the background region image and the high-frequency image signal included in the differential image. Therefore, the image processing system 10 may be able to compress images efficiently with it being possible to maintain the image quality of the image within the ROI.

Figure 11:
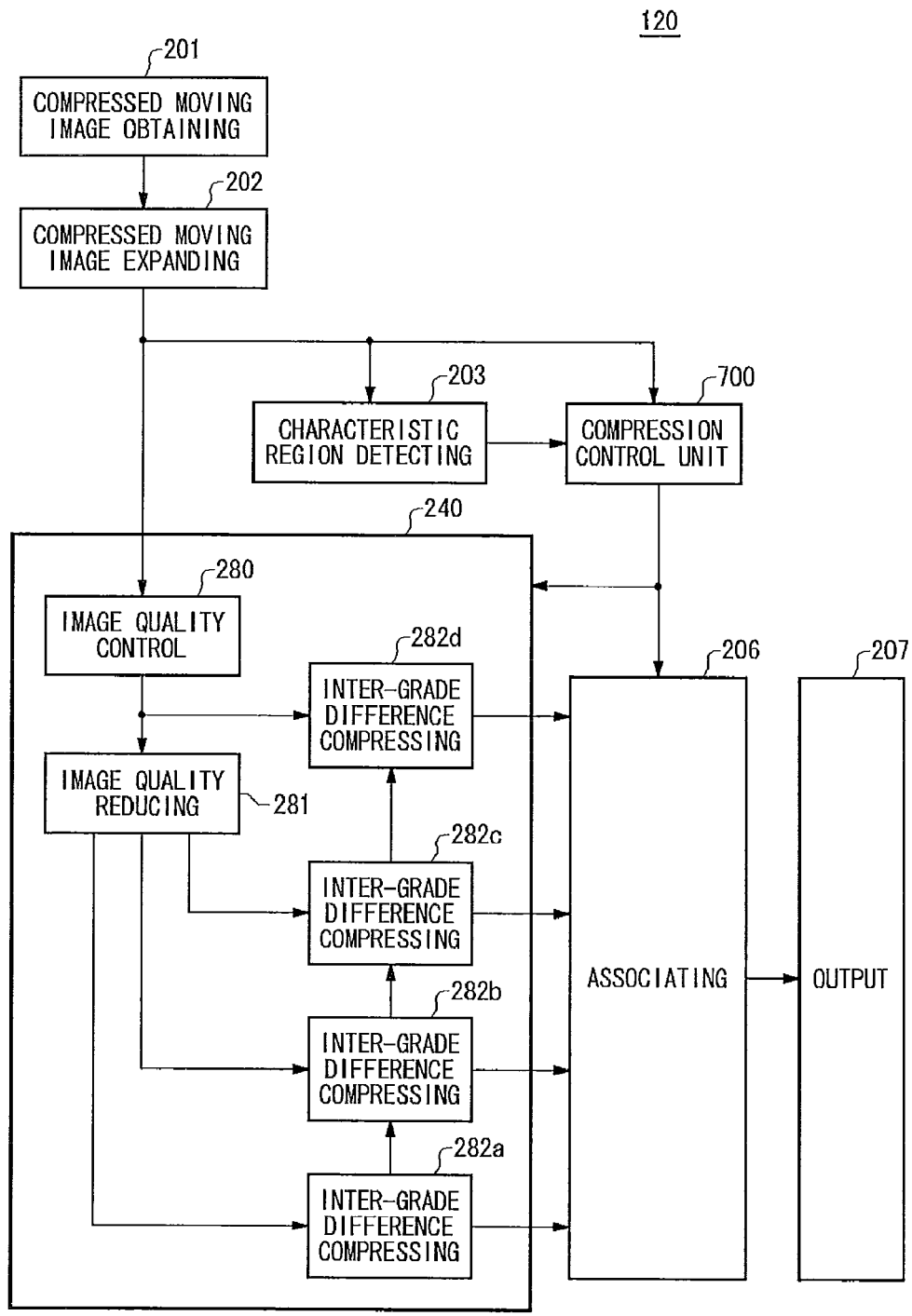
FIG. 11 illustrates another exemplary block configuration of the image processing apparatus 120.

FIG. 11 illustrates another exemplary block configuration of the image processing apparatus 120. The image processing apparatus 120 includes the compressed moving image obtaining section 201, the compressed moving image expanding section 202, the characteristic region detecting section 203, the compressing section 240, the compression control unit 700, the associating section 206, and the output section 207. The compressing section 240 includes an image quality control section 280, an image quality reducing section 281, a plurality of inter-grade difference compressing sections 282a to 282d (hereinafter collectively referred to as the inter-grade difference compressing sections 282).

The compressed moving image obtaining section 201, the compressed moving image expanding section 202, the characteristic region detecting section 203, the compression control unit 700, the associating section 206, and the output section 207 have substantially the same functions and operations as the compressed moving image obtaining section 201, the compressed moving image expanding section 202, the characteristic region detecting section 203, the compression control unit 700, the associating section 206, and the output section 207 described with reference to FIGS. 2 to 10. Therefore, the following does not explain those constituents, unless they are different from their counterparts described with reference to FIGS. 2 to 10.

The image quality control section 280 controls the image qualities of characteristic regions in each of the moving-image-component images generated by the compressed moving image expanding section 202 and the image quality of a non-characteristic region, in accordance with the pieces of character information of the characteristic regions.

The image quality reducing section 281 reduces the image quality of the moving image, and generates a plurality of moving images with predetermined different image qualities. The image quality reducing section 281 supplies the generated moving images with different image qualities to the inter-grade difference compressing sections 282. Specifically speaking, the image quality reducing section 281 generates the moving images with different image qualities by reducing the frame rate of the moving image, or lowering the resolution of the moving-image-component image included in the moving image. The inter-grade difference compressing sections 282 respectively obtain from the image quality reducing section 281 the moving images of the predetermined different image qualities, and compress the obtained moving images. Here, each inter-grade difference compressing section 282 compresses a moving image having a different image quality. Note that the moving-image-component image included in the moving image supplied to the inter-grade difference compressing section 282a has a lower image quality than the characteristic region images which are the moving-image-component images included in the moving images supplied to the inter-grade difference compressing sections 282b to 282d. Which is to say, the image quality reducing section 281 generates low-image-quality images having a lower image quality than the characteristic region images supplied to the inter-grade difference compressing section 282b to 282d, and supplies the low-image-quality images to the inter-grade difference compressing section 282a.

As described above, the inter-grade difference compressing section 282a obtains from the image quality reducing section 281 the moving-image-component image having a lower resolution than the moving-image-component images received by any of the inter-grade difference compressing sections 282b to 282d, and compresses the obtained moving-image-component image. The inter-grade difference compressing sections 282b to 282d obtain from the image quality reducing section 281 the moving-image-component images and compress the obtained moving-image-component images. Here, the resolutions of the moving-image-component images become higher in the order of the inter-grade difference compressing sections 282b, 282c, and 282d.

The inter-grade difference compressing section 282b expands the moving-image-component image which has been compressed by the inter-grade difference compressing section 282a, and enlarges the resulting moving-image-component image so as to have the same resolution as the moving-image-component image obtained from the image quality reducing section 281. The inter-grade difference compressing section 282b compresses the differential image between the enlarged moving-image-component image and the moving-image-component image obtained from the image quality reducing section 281. Here, the inter-grade difference compressing section 282b generates the differential image which has differential values in the characteristic regions but has no differential values in the non-characteristic region and compresses the generated difference image.

The inter-grade difference compressing section 282c expands the moving-image-component image which has been compressed by the inter-grade difference compressing section 282b, and enlarges the resulting moving-image-component image so as to have the same resolution as the moving-image-component image obtained from the image quality reducing section 281. The inter-grade difference compressing section 282c compresses the differential image between the enlarged moving-image-component image and the moving-image-component image obtained from the image quality reducing section 281. Here, the inter-grade difference compressing section 282c generates the differential image which has differential values in at least some of the characteristic regions but has no differential values in the region other than the above-mentioned some of the characteristic regions and compresses the generated differential image. Here, the above-mentioned some of the characteristic regions are selected in accordance with the pieces of character information of the characteristic regions.

The inter-grade difference compressing sections 282d expands the moving-image-component image which has been compressed by the inter-grade difference compressing section 282c, and enlarges the resulting moving-image-component image so as to have the same resolution as the moving-image-component image obtained from the image quality control section 280. The inter-grade difference compressing sections 282d compresses the differential image between the enlarged moving-image-component image and the moving-image-component image obtained from the image quality control section 280. Here, the inter-grade difference compressing section 282d generates the differential image which has differential values in at least some of the characteristic regions which are selected in accordance with the pieces of character information but has no differential values in the region other than the above-mentioned some of the characteristic regions and compresses the generated differential image.

As described above, each of the inter-grade difference compressing sections 282b to 282d produces the differential image by calculating the difference between the moving-image-component image received from the image quality control section 280 or image quality reducing section 281 and the moving-image-component image obtained by enlarging the moving-image-component image having a lower resolution. The associating section 206 associates the compressed moving image data including the moving-image-component images obtained by the compressing operations of the inter-grade difference compressing sections 282a to 282d, with information identifying the characteristic regions. The output section 207 transmits to the image processing apparatus 170 the compressed moving image data which is associated by the associating section 206 with the information identifying the characteristic regions. As a result, the image processing apparatus 120 can provide a moving image which has been scalably compressed and coded in accordance with the pieces of character information of the characteristic regions.

Figure 12A:
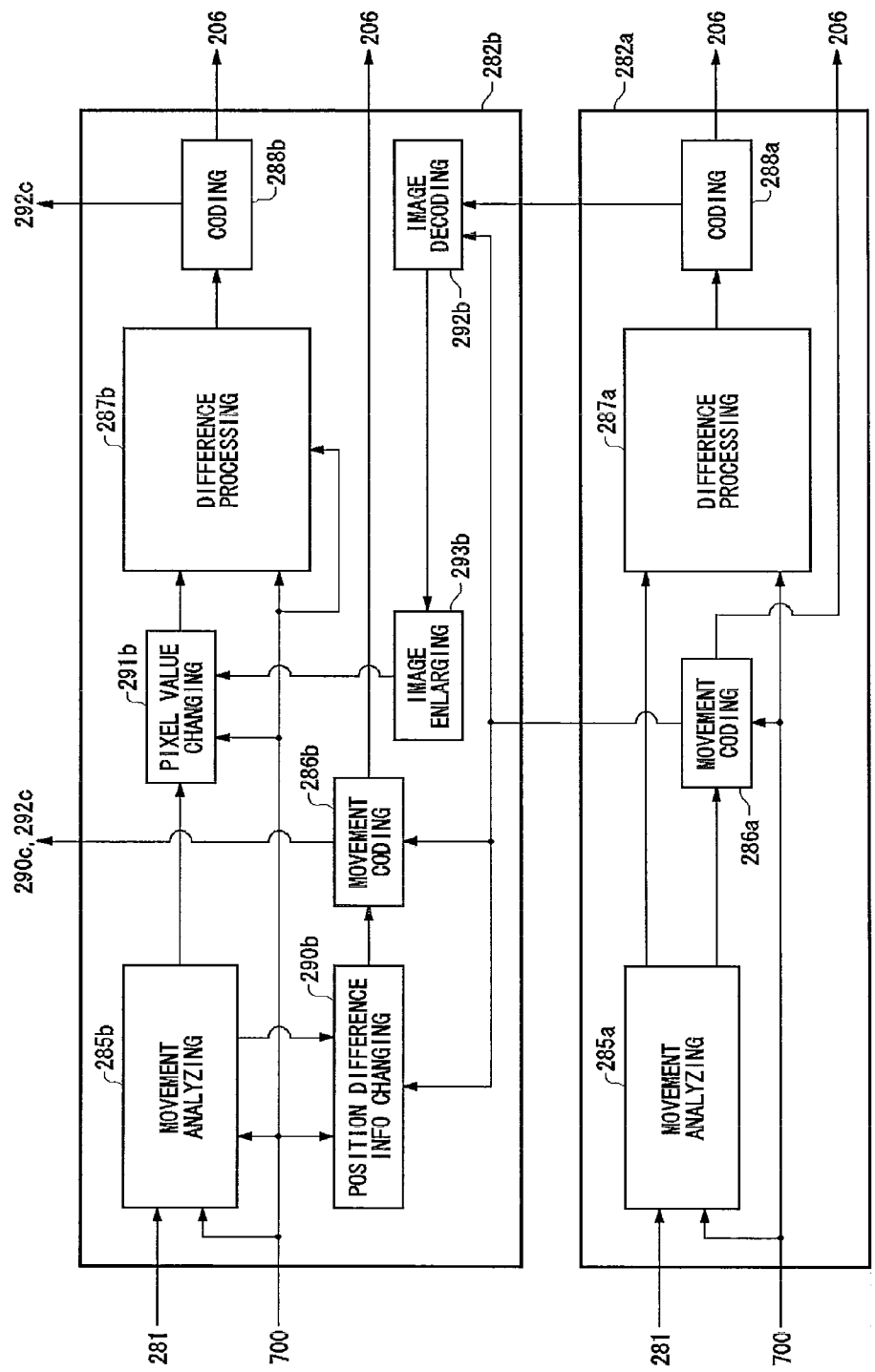
FIG. 12A illustrates exemplary block configurations of inter-grade difference compressing sections 282a and 282b.
Figure 12B:
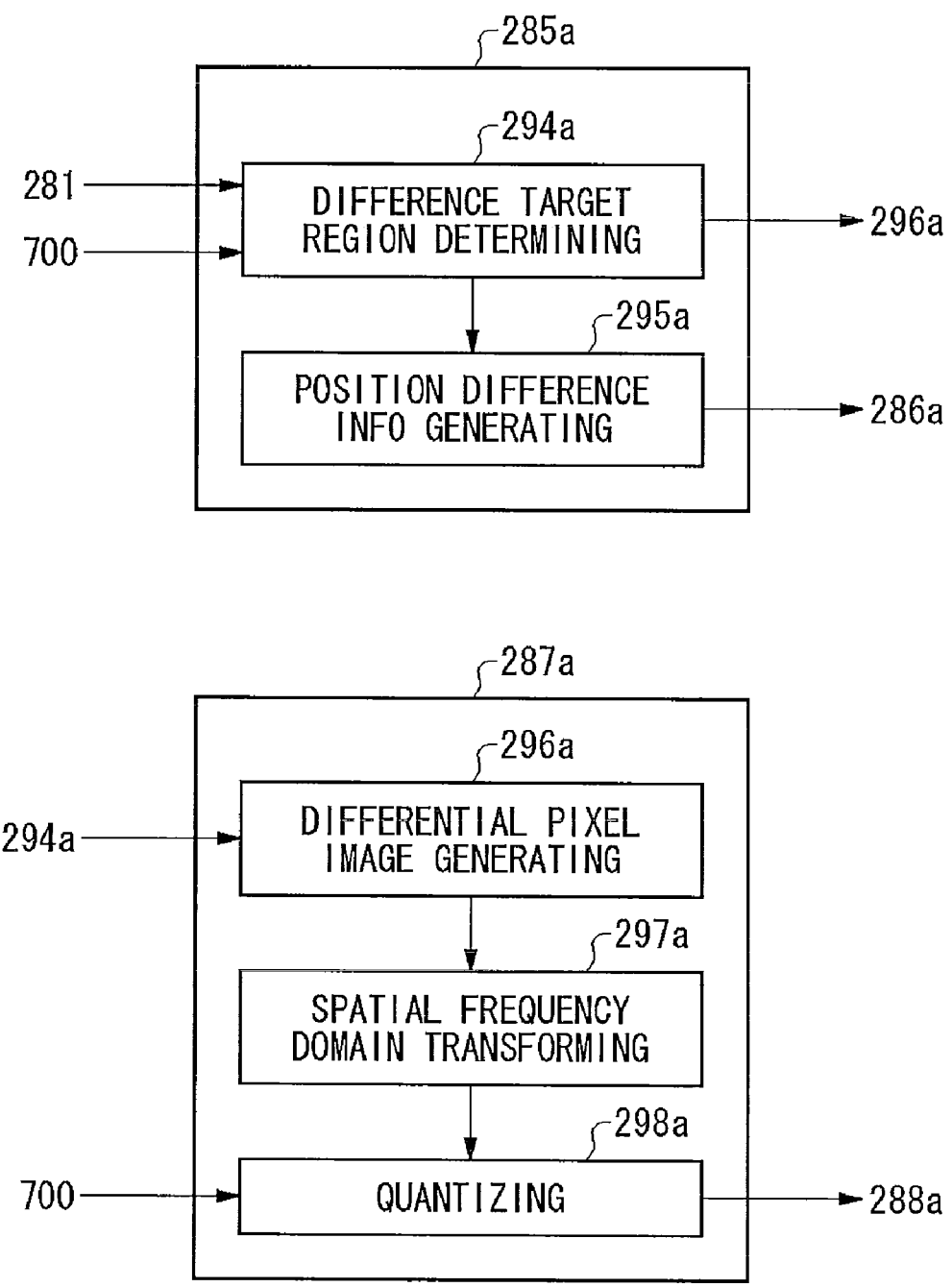
Figure 12C:
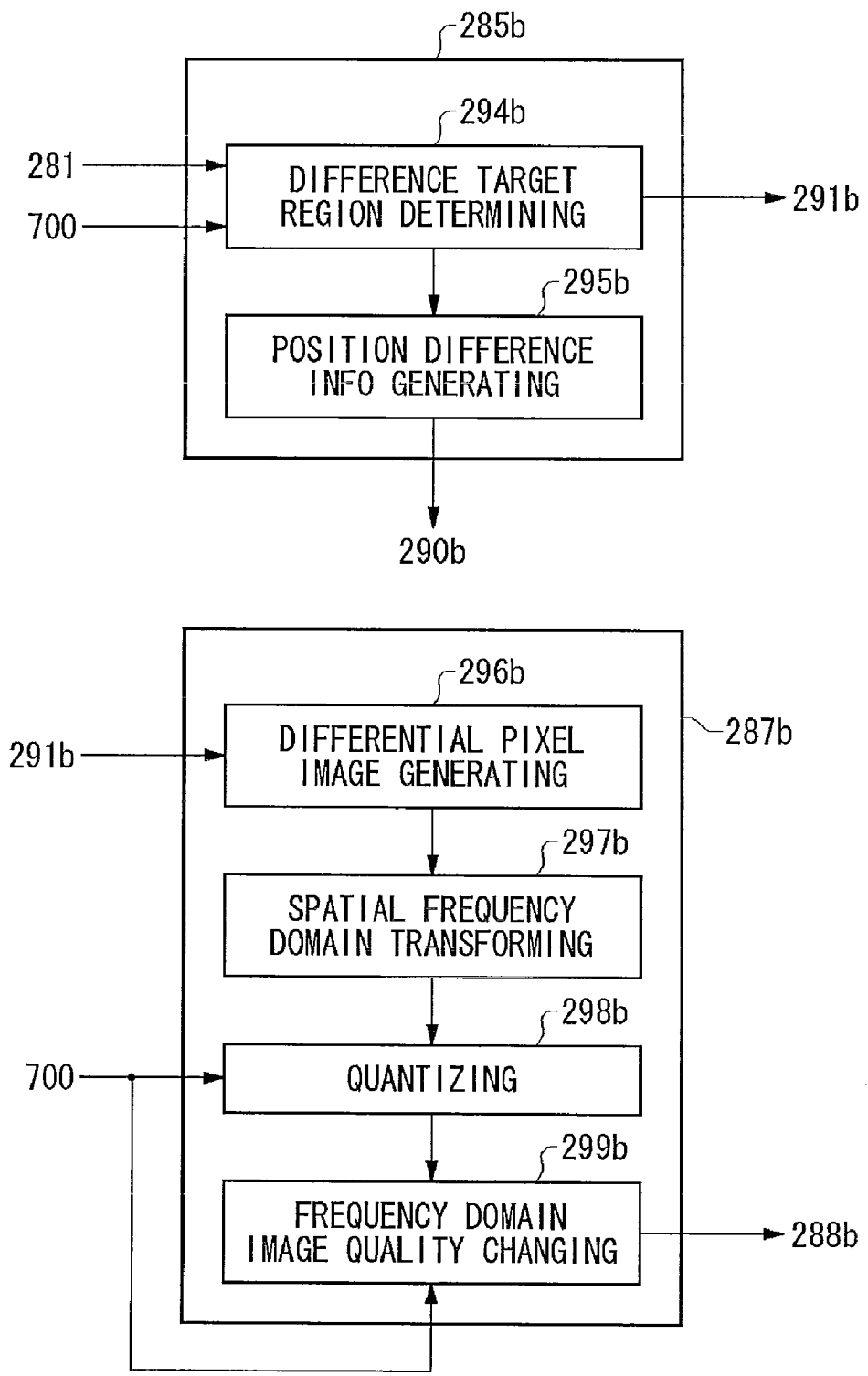
FIG. 12C illustrates exemplary block configurations of a movement analyzing section 285b and a difference processing section 287b.

FIG. 12A illustrates exemplary block configurations of the inter-grade difference compressing sections 282a and 282b. FIG. 12B illustrates exemplary block configurations of a movement analyzing section 285a and a difference processing section 287a. FIG. 12C illustrates exemplary block configurations of a movement analyzing section 285b and a difference processing section 287b. The inter-grade difference compressing section 282a includes a movement analyzing section 285a, a movement coding section 286a, a difference processing section 287a, and a coding section 288a. The movement analyzing section 285a includes a difference target region determining section 294a and a position difference information generating section 295a. The difference processing section 287a includes a differential pixel image generating section 296a, a spatial frequency domain transforming section 297a and a quantizing section 298a.

The inter-grade difference compressing section 282b includes a movement analyzing section 285b, a movement coding section 286b, a difference processing section 287b, an image enlarging section 293b, an image decoding section 292b, a pixel value changing section 291b, and a coding section 288b. The movement analyzing section 285b includes a difference target region determining section 294b and a position difference information generating section 295b. The difference processing section 287b includes a differential pixel image generating section 296b, a spatial frequency domain transforming section 297b, a quantizing section 298b, and a frequency domain image quality converting section 299b. Note that the inter-grade difference compressing sections 282c and 282d have substantially the same constituents as the inter-grade difference compressing section 282b and thus are not explained herein.

The following describes the functions and operations of the constituents of the inter-grade difference compressing section 282a. The movement analyzing section 285a receives moving-image-component images from the image quality reducing section 281, analyzes movement across a plurality of moving-image-component images based on what is shown by the received moving-image-component images, and refers to the analyzed movement to determine a partial region to be compressed in a moving-image-component image.

Specifically speaking, the difference target region determining section 294a refers to the pixel values of the moving-image-component images in the partial region and, when a moving-image-component image is compressed by calculating its difference from a different moving-image-component image, determines the partial region in the different moving-image-component image that is a difference-target image to be compared to calculate the difference. The difference target region determining section 294a supplies pixel information of the partial region of the moving-image-component image to be compressed and pixel information of the partial region of the difference-target image, to the difference processing section 287a.

The position difference information generating section 295a generates position difference information indicating the difference in position between the partial region to be compressed and the partial region in the difference-target image. Specifically speaking, the position difference information generating section 295a generates a motion vector for use with the motion compensation technique. The position difference information generating section 295a supplies the generated position difference information to the movement coding section 286a.

The movement coding section 286a codes the position difference information supplied from the position difference information generating section 295a, and supplies the coded position difference information to the associating section 206. For example, the movement coding section 286a codes the difference between pieces of position difference information for adjacent partial regions, and supplies the result to the associating section 206.

The difference processing section 287a compresses the image of the partial region to be compressed based on the difference between the pixel information of the partial region to be compressed and the pixel information of the partial region in the difference-target image, which are received from the movement analyzing section 285a. Specifically speaking, the differential pixel image generating section 296a generates a differential pixel image based on the difference between the pixel information of the partial region to be compressed and the pixel information of the partial region in the difference-target image.

The spatial frequency domain transforming section 297a transforms the differential pixel image of each partial region into a spatial frequency domain. Specifically speaking, the spatial frequency domain transforming section 297a transforms the differential pixel image of each partial region into a spatial frequency domain by the discrete cosine transform (DCT). Here, the spatial frequency domain transforming section 297a may transform the differential pixel image of each partial region into a spatial frequency domain by using a variety of frequency transforming techniques including Hadamard transformation and wavelet transformation.

When the movement analyzing section 285a decides that a partial region in a moving-image-component image is not compressed by using its difference from a partial region in a different moving-image-component image, the difference processing section 287a supplies the pixel information of the partial region to be compressed to the spatial frequency domain transforming section 297a. The spatial frequency domain transforming section 297a transforms the pixel information of each partial region into a spatial frequency domain as mentioned above.

The quantizing section 298a quantizes the transform coefficients obtained as a result of the transformation into the spatial frequency region performed by the spatial frequency domain transforming section 297a. The coding section 288a codes the quantized transform coefficients obtained by the quantizing section 298a, to compress the quantized transform coefficients. For example, the coding section 288a codes the quantized transform coefficients obtained by the quantizing section 298a by way of entropy coding such as Huffman coding and arithmetic coding. The coding section 288a supplies the coded moving image to the associating section 206.

The following describes the functions and operations of the constituents of the inter-grade difference compressing section 282b. Here, some of the constituents of the inter-grade difference compressing section 282b are assigned the same reference numerals as the constituents of the inter-grade difference compressing section 282a, and have similar functions and operations to their corresponding constituents of the inter-grade difference compressing section 282a. Therefore, such constituents are not described in the following except for their differences.

For each of the moving-image-component images received from the image quality reducing section 281, the difference target region determining section 294b identifies a partial region in a different moving-image-component image that is to be compared to calculate its difference from a partial region in the moving-image-component image to be compressed, similarly to the difference target region determining section 294a. As described, the difference target region determining section 294b determines, for a partial region in a characteristic region image, a partial region which is included in a characteristic region image generated from a different moving-image-component image and which is to be compared to calculate its difference from the partial region in the characteristic region image. The difference target region determining section 294b supplies the pixel information of the partial region to be compressed and the pixel information of the partial region in the difference-target image, to the pixel value changing section 291b.

The image decoding section 292b obtains a moving-image-component image from the coding section 288a, and obtains position difference information from the movement coding section 286a. The image decoding section 292b decodes the moving-image-component image obtained from the coding section 288a by means of the position difference information obtained from the movement coding section 286a. The image decoding section 292b may obtain the moving-image-component image which has been quantized by the quantizing section 298a and decode the obtained moving-image-component image, or may obtain the moving-image-component image which has been coded by the coding section 288a and decode the obtained moving-image-component images.

The image enlarging section 293b enlarges the moving-image-component image which has been decoded by the image decoding section 292b, to generate an enlarged image. The pixel value changing section 291b replaces the pixel values of a partial region that is not contained in the characteristic region with the pixel values of a partial region in the enlarged image, without changing the pixel values of a partial region containing the characteristic region, where the both partial regions are determined by the difference target region determining section 294b. In this manner, the pixel value changing section 291b generates characteristic region images in which the pixel values of a non-characteristic region have been replaced by the pixel values of the enlarged images, based on the received moving-image-component images.

The difference processing section 287b receives, from the pixel value changing section 291b, the characteristic region image to be compressed, the image information of the partial region that is a difference target of the partial region contained in the characteristic region image, and the enlarged images. The difference processing section 287b subsequently selects one of the following three coding techniques for each of the partial regions contained in the characteristic region image to be compressed, where the three coding techniques include intra coding, inter coding and inter-grade coding. The intra coding codes the partial region by using the pixel information of the characteristic region image in which the partial region is contained. The inter coding codes the partial region by means of the difference between the partial region and the difference-target partial region contained in a different moving-image-component image. The inter-grade coding codes the partial region by means of the difference between the partial region and the enlarged images. When making the selection, the difference processing section 287b gives priority to a coding method which realizes the smallest code amount. Note that the difference processing section 287b selects the inter-grade coding for the non-characteristic region, since the pixel values in the non-characteristic region are replaced so as to have no differences. Therefore, the following first describes the inter-grade coding, and subsequently explains the inter coding and the intra coding.

When the difference processing section 287b selects the inter-grade coding, the differential pixel image generating section 296b generates a differential pixel image representing a difference in pixel value between the characteristic region image and the enlarged image. Specifically speaking, the differential pixel image generating section 296b generates the differential pixel image based on the difference between the characteristic region image in which the pixel values in the non-characteristic region are replaced and the enlarged image. Since the pixel values in the non-characteristic region of the characteristic region image are replaced with the pixel values of the enlarged image, the differential pixel image generating section 296b can generate a differential pixel image which, in the characteristic region, has differential values representing the difference in pixel value between the characteristic region image and the enlarged image and, in the non-characteristic region, has no such differential values.

When the difference processing section 287b selects the inter coding, the differential pixel image generating section 296b calculates the difference between a characteristic region image generated by the pixel value changing section 291b based on a moving-image-component image and a characteristic region image generated by the pixel value changing section 291b based on a different moving-image-component image. Specifically speaking, the differential pixel image generating section 296b calculates the difference between an image of a partial region contained in the characteristic region image and an image of a difference-target partial region which is determined by the difference target region determining section 294b for the partial region. Since the pixel values in the non-characteristic region in the characteristic region image are replaced with the pixel values of the enlarged image, the differential pixel image generating section 296b can generate a differential pixel image which, in the partial region contained in the characteristic region, has differential values representing the difference in pixel value between the partial region and the partial region determined by the difference target region determining section 294b and, in the non-characteristic region, has differential values representing the difference in pixel value between the non-characteristic region and the partial region determined by the difference target region determining section 294b.

When the difference processing section 287b selects the intra coding, the differential pixel image generating section 296b generates a differential pixel image by calculating the difference in pixel value between the image of the partial region contained in each of the characteristic region images and a different region of the characteristic region image, or between the image of the partial region contained in each of the characteristic region images and the same partial region of the characteristic region image.

The spatial frequency domain transforming section 297b transforms the differential pixel image of each partial region into a spatial frequency domain. Specifically speaking, the spatial frequency domain transforming section 297b transforms the differential values represented by the differential pixel image of each partial region into a spatial frequency domain, by using DCT, Hadamard transform, or wavelet transform, similarly to the spatial frequency domain transforming section 297a. The quantizing section 298b quantizes the transform coefficients obtained as a result of the transformation into the spatial frequency domain performed by the spatial frequency domain transforming section 297b, similarly to the quantizing section 298b.

The frequency domain image quality changing section 299b generates a characteristic region difference image by reducing the data amount of the spatial frequency components of at least some partial regions containing the non-characteristic region, from among the spatial frequency components of the respective partial regions which are obtained by the spatial frequency domain transform performed by the spatial frequency domain transforming section 297b. Specifically speaking, the frequency domain image quality changing section 299b reduces the values of the transform coefficients indicating higher frequency components than a predetermined frequency. The frequency domain image quality changing section 299b may set, at zero, the values of the transform coefficients indicating higher frequency components than a predetermined frequency.

As described above, the difference processing section 287b generates a characteristic region difference image which, in the characteristic region, has spatial frequency components obtained by transforming the difference between the characteristic region image and the enlarged image into the spatial frequency domain and, in the non-characteristic region, has spatial frequency components with a reduced data amount. The coding section 288b codes the characteristic region difference image generated by the difference processing section 287b.

Also as described above, the difference processing section 287b generates a characteristic region difference image representing a differential image between the image of the characteristic region in the characteristic region image and the image of the characteristic region in the low-image-quality image. Specifically speaking, the difference processing section 287b generates a characteristic region difference image representing a difference between the image of the characteristic region in the characteristic region image and the image obtained by enlarging the image of the characteristic region in the low-image-quality image.

According to the above description, the pixel value changing section 291b replaces the pixel values of the non-characteristic region with the pixel values of the enlarged image in order that the differential pixel image has the differential values of zero in at least the non-characteristic region, where the non-characteristic region is different from a characteristic region having a predetermined type of character and different from a characteristic region having a certain type of character that is expected to have higher resolution than the characteristic region. However, the pixel value changing section 291b can set the differential values in the differential pixel image at zero by using a different method.

For example, the pixel value changing section 291b may change the pixel values of the non-characteristic region in the moving-image-component image obtained from the image quality reducing section 281 into a predetermined pixel value, and change the pixel values of the same image region in the enlarged image into the predetermined pixel value. This alternative method also produces such an effect that the differential pixel image has the differential values of zero in the non-characteristic region, thereby substantially reducing the information amount of the non-characteristic region.

As explained above, the pixel value changing section 291b generates characteristic region images by replacing the pixel values of the non-characteristic region in a moving-image-component image with a predetermined value and replacing the pixel values of the non-characteristic region in the enlarged image with the predetermined value. The differential pixel image generating section 296b generates a differential pixel image by calculating the difference between the characteristic region image and the enlarged image, in both of which the pixel values have been replaced in the non-characteristic regions.

The pixel value changing section 291b may replace the pixel values of the non-characteristic region of the moving-image-component image obtained from the image quality reducing section 281 with the pixel values of the same region in the image obtained by enlarging the moving-image-component image provided to an inter-grade difference compressing section 282 of a lower grade (for example, the inter-grade difference compressing section 282a). This alternative method also enables the differential pixel image to have the differential values of substantially zero in the non-characteristic region, thereby substantially reducing the information amount of the non-characteristic region.

The position difference information generating section 295b generates position difference information indicating the difference in position of a difference-target partial region contained in the non-characteristic region. Specifically speaking, the position difference information generating section 295b generates position difference information indicating the difference in position between a partial region to be compressed by calculating a difference and a difference-target partial region to be compared to calculate the difference, similarly to the position difference information generating section 295a. Here, the position difference information includes a motion vector for use with the motion compensation.

The position difference information changing section 290b changes the position difference information so that the position difference information indicates that the partial region contained in the non-characteristic region is compared with a partial region in the same position to calculate the difference. Specifically speaking, the position difference information changing section 290b changes the position difference information of the partial region contained in the non-characteristic region into position difference information indicating there is no difference in position. The position difference information changing section 290b obtains the position difference information from the movement coding section 286a, and changes the position difference information of the partial region contained in the non-characteristic region into information indicating that there is no difference in position. Specifically speaking, the position difference information changing section 290b sets the value of the motion vector of the non-characteristic region at zero. For example, the position difference information changing section 290b sets, at zero, the value of the motion vector of the non-characteristic region received from the position difference information generating section 295b and sets, at zero, the value of the motion vector of the non-characteristic region received from the movement coding section 286a.

The movement coding section 286b codes the position difference information. Specifically speaking, the movement coding section 286b codes the difference between pieces of position difference information of adjacent partial regions, similarly to the movement coding section 286a. The movement coding section 286b supplies the coded position difference information to the associating section 206.

In the present embodiment, the position difference information changing section 290 changes the position difference information for the non-characteristic region. The position difference information changing section 290b may change the position difference information for the non-characteristic region by way of the coding format used by the movement coding section 286b. Which is to say, the position difference information changing section 290b may change the position difference information that has been coded by the movement coding section 286, so that the changed position difference information indicates that the partial region contained in the non-characteristic region is compared with a partial region in the same position to calculate a difference.

The coding section 288b may generate coded data that has no difference information in the non-characteristic region. Specifically speaking, the coding section 288b may generate coded data that has no difference information in the partial region contained in the non-characteristic region. The movement coding section 286b may generate coded data that has no position difference information for the partial region contained in the non-characteristic region. As stated, the coding section 288b and the movement coding section 286b generate coded data which indicates that the non-characteristic region shows the same image as the same region in a different moving-image-component image by not having difference information and position difference information. For example, the coding section 288b and the movement coding section 286b may generate coded data including a partial region type, which indicates that the partial region contained in the non-characteristic region shows the same image as the same region in a different moving-image-component image.

For example, the coding section 288b and the movement coding section 286b may generate coded data including a partial region type, which indicates that the partial region contained in the non-characteristic region is coded by using a coding mode that is based on simple inter-frame prediction coding and has no conversion coefficients. For example, the partial region type may correspond to the Non MC Not Coded mode of the MPEG coding technique. As described above, since the coding section 288b and the movement coding section 286b generate coded data without information indicating that the value of the motion vector and the difference information are set at zero, the present embodiment can further reduce the code amount of the coded moving-image-component image. Here, when determining the prediction mode including the above-mentioned coding mode, the inter-grade difference compressing section 282b may select a prediction mode which can minimize rate distortion cost based on the Lagrange's method of undetermined multipliers.

The inter-grade difference compressing sections 282c and 282d each include constituents having the same functions as the constituents of the inter-grade difference compressing section 282b. In the following description, the constituents of the inter-grade difference compressing sections 282c and 282d which have the same names as the corresponding constituents of the inter-grade difference compressing section 282b are assigned the same reference numerals, where the alphabetical letters b, c and d added to the reference numerals represent the belongingness of the respective constituents from among the inter-grade difference compressing sections 282b, 282c and 282d.

For example, the movement analyzing section 285c is one of the constituents of the inter-grade difference compressing section 282c, and the movement analyzing section 285d is one of the constituents of the inter-grade difference compressing section 282d. In the following description, a reference number without an alphabetical letter refers to all of the corresponding constituents of the inter-grade difference compressing sections 282b to 282d. For example, the pixel value changing section 291 denotes the pixel value changing sections 291b to 291d.

The inter-grade difference compressing sections 282c and 282d are different in terms of the operations and functions from the inter-grade difference compressing section 282b in the following aspects. The inter-grade difference compressing sections 282c and 282d obtain moving images of different image qualifies from the image quality reducing section 281 than the inter-grade difference compressing section 282b and process the obtained moving images, and the position difference information changing sections 290c and 290d and the image decoding sections 292c and 292d obtain the position difference information and moving-image-component images for use in the differential processing from different inter-grade difference compressing sections 282, which are designed to process moving images of lower image qualities.

More specifically, the position difference information changing section 290c obtains position difference information from the movement coding section 286b, and changes the obtained position difference information. The image decoding section 292c obtains the position difference information from the movement coding section 286b, obtains moving-image-component images from the coding section 288b, and decodes the obtained moving-image-component images by using the obtained position difference information. The position difference information changing section 290d obtains position difference information from the movement coding section 286c, and changes the obtained position difference information. The image decoding section 292d obtains the position difference information from the movement coding section 286c, obtains moving-image-component images from the coding section 288c, and decodes the obtained moving-image-component images by using the obtained position difference information.

The characteristic region detecting section 203 detects a plurality of characteristic regions with different types of characters from the input moving-image-component image. In this case, the image quality reducing section 281 generates a characteristic region image from the input moving-image-component image by reducing the resolution of a characteristic region having a certain type of character, and generates a different characteristic region image having a higher resolution than the above characteristic region image in a characteristic region having a different type of character from the input moving-image-component image. The inter-grade difference compressing sections 282b to 282d are associated with the types of characters in a one-to-one correspondence. Each of the inter-grade difference compressing sections 282b to 282d compresses a characteristic region image in which at least a characteristic region with a predetermined type of character has a different resolution from a non-characteristic region.

Specifically speaking, the inter-grade difference compressing section 282b processes a low-resolution characteristic region image which has the lowest resolution in all of the characteristic regions. The inter-grade difference compressing section 282c processes a medium-resolution characteristic region image which has a higher resolution than the low-resolution characteristic region image in characteristic regions of predetermined character types. The inter-grade difference compressing section 282d processes a high-resolution characteristic region image which has a high resolution in a characteristic region of a different predetermined character type.

As stated, the difference processing section 287 generates a characteristic region difference image which has, in a characteristic region with a certain type of character and a characteristic region with a different type of character, spatial frequency components obtained by transforming the difference between a characteristic region image and an enlarged image into the spatial frequency domain and, in the remaining region, spatial frequency components with a reduced data amount.

As described above, the difference processing section 287 generates a characteristic region difference image which has, in a characteristic region with a certain type of character, spatial frequency components obtained by transforming the difference between a characteristic region image and an enlarged image into the spatial frequency domain and, in the remaining region, has spatial frequency components with a reduced data amount, and generates an inter-characteristic-region difference image which, in a characteristic region with a different type of character; has spatial frequency components obtained by transforming the difference between a different characteristic region image and an image obtained by enlarging the characteristic region in the different characteristic region image into the spatial frequency domain and, in the remaining region, has spatial frequency components with a reduced data amount.

The coding section 288 codes the characteristic region difference image, the inter-characteristic-region difference image, and the low-image-quality image. The associating section 206 associates, with information identifying the characteristic regions, the position difference information coded by the movement coding sections 286a to 286d and the moving-image-component images (for example, the low-image-quality image, the characteristic region difference image, and the inter-characteristic-region difference image) coded by the coding sections 288a to 288d.

As described above, the inter-grade difference compressing section 282a generates a moving-image-component image whose image quality is reduced in the entire region including a characteristic region, in other words, generates a moving-image-component image containing the low spatial frequency components of the input moving-image-component image. The inter-grade difference compressing section 282b generates a moving-image-component image having frequency components higher than the frequency components of the inter-grade difference compressing section 282*a* and lower than the frequency components of the inter-grade difference compressing section 282*c*. The inter-grade difference compressing section 282*b* generates a moving-image-component image in which the differential values representing the difference between the moving-image-component image and the moving-image-component image generated by the inter-grade difference compressing section 282*a* are reduced in the non-characteristic region.

Similarly, the inter-grade difference compressing section 282*c* generates a moving-image-component image having frequency components higher than the frequency components of the inter-grade difference compressing section 282*b* and lower than the frequency components of the inter-grade difference compressing section 282*d*. The inter-grade difference compressing section 282*d* generates a moving-image-component image having higher frequency components than the inter-grade difference compressing section 282*c*. The inter-grade difference compressing sections 282*c* and 282*d* generate moving-image-component images in which the differential values representing the respective differences between the moving-image-component images and the moving-image-component images generated by the inter-grade difference compressing sections 282*b* and 282*c* in the non-characteristic region.

As described above, each of the inter-grade difference compressing sections 282*b*, 282*c* and 282*d* processes a moving image in which a characteristic region having a predetermined type of character has a higher image quality than the remaining region. Thus, the inter-grade difference compressing sections 282*b*, 282*c* and 282*d* can provide, to outside, moving images whose image qualities are different in accordance with the types of characters. Here, each of the inter-grade difference compressing sections 282*b*, 282*c* and 282*d* can efficiently compress the moving image by compressing the differences between its moving-image-component images and moving-image-component images with a lower image quality which are processed by a different one of the inter-grade difference compressing sections 282*b*, 282*c* and 282*d*.

When detecting the character information of each characteristic region, the characteristic region detecting section 203 may calculate, for each characteristic region, the degree of reliability indicating how reliable the characteristic region is. Each of the inter-grade difference compressing sections 282*b*, 282*c* and 282*d* compresses the image of the characteristic region whose resolution is adjusted in accordance with the character information and the degree of reliability of the characteristic region. For example, the image quality reducing section 281 may adjust the resolution of the image of each characteristic region in accordance with the character information and the degree of reliability of the characteristic region, and supply the adjusted image to the corresponding one of the inter-grade difference compressing sections 282. For example, the image quality reducing section 281 may increase the resolution of the image of each characteristic region image as the degree of reliability decreases, where the adjusted resolution is higher than a predetermined resolution in accordance with the character information.

As described above, the image processing apparatus 120 performs hierarchical coding by coding the differences between the images of different grades which have different resolutions. As is apparent from this configuration, the compressing method used by the image processing apparatus 120 partly includes the compressing method of H.264/SVC. When expanding such hierarchically-arranged compressed moving images, the image processing apparatus 170 decodes the pieces of moving-image data of the respective grades one by one, to obtain a plurality of moving-image-component images associated with each grade. The image processing apparatus 170 then adds together the region of the obtained moving-image-component images which was coded by using the inter-grade difference and the region of the moving-image-component images associated with a different grade which was compared to calculate the inter-grade difference. In this manner, the image processing apparatus 170 can generate a plurality of moving-image-component images contained in a moving image for each grade.

Figure 13:
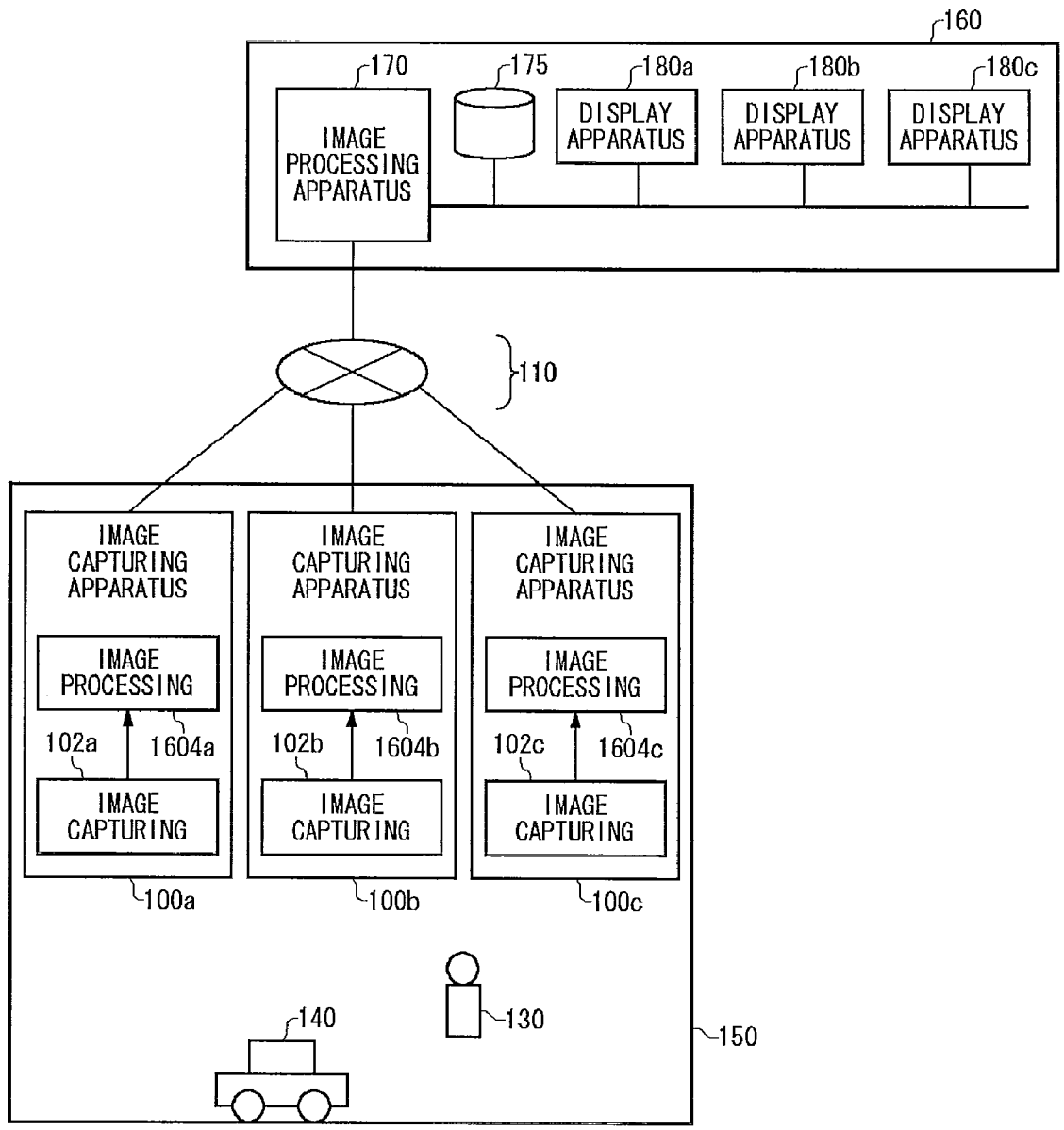
FIG. 13 illustrates an exemplary configuration of an image processing system 20 relating to a different embodiment.

FIG. 13 illustrates an exemplary configuration of an image processing system 20 relating to a different embodiment. The image processing system 20 relating to the present embodiment is configured in the same manner as the image processing system 10 illustrated in FIG. 1, except that the image processing apparatuses 120*a* to 120*c* are replaced by image processing sections 1604*a* to 1604*c* (hereinafter, collectively referred to as the image processing section 1604) included in the image capturing apparatuses 100*a* to 100*c*.

The image processing section 1604 includes the constituents of the image processing apparatus 120 except for the compressed moving image obtaining section 201 and the compressed moving image expanding section 202. The constituents of the image processing section 1604 may have substantially the same functions and operations as the corresponding constituents of the image processing apparatus 120 except that the constituents of the image processing section 1604 process the captured moving image captured by the image capturing section 102, where the constituents of the image processing apparatus 120 process the captured moving image which is obtained by the expanding operation of the compressed moving image expanding section 202. The image processing system 20 having the above-described configuration can produce the same effects as the image processing system 10 as described with reference to FIGS. 1 to 12.

The image processing section 1604 may obtain a captured moving image including a plurality of moving-image-component images in the RAW format from the image capturing section 102. The image processing section 1604 may detect one or more characteristic regions in each of the moving-image-component images in the RAW format. The image processing section 1604 may compress the moving-image-component images in the RAW format included in the obtained captured moving image, without changing the RAW format. Here, the image processing section 1604 can compress the captured moving image by using the compressing methods described in relation to the operations of the image processing apparatus 120 with reference to FIGS. 1 to 12.

The image processing apparatus 170 can obtain the moving-image-component images in the RAW format by expanding the compressed moving image obtained from the image processing section 1604. The image processing apparatus 170 may perform color estimation (coinciding) processing on the moving-image-component images in the RAW format which are obtained by the expansion, for example, on a region to region basis where the regions include the non-characteristic region and the regions containing the characteristic regions. Here, the image processing apparatus 170 may perform more accurate synchronizing operation on the characteristic regions than on the non-characteristic region.

The image processing apparatus 170 may perform super-resolution processing on the images of the characteristic regions which are obtained by synchronizing the moving-image-component images. The super-resolution processing performed by the image processing apparatus 170 can be exemplified by super-resolution processing based on principal component analysis as disclosed in Japanese Patent Application Publication No. 2006-350498, or super-resolution processing based on movement of a subject as disclosed in Japanese Patent Application Publication No. 2004-88615.

Here, the image processing apparatus 170 may perform the super-resolution processing on each of the objects contained in a characteristic region. For example, when a characteristic region contains the image of a person's face, the image processing apparatus 170 may perform the super-resolution processing on each of the face elements (for example, the eyes, the nose, the mouth and the like), which are shown as examples of the objects. In this case, the image processing apparatus 170 stores the learning data of each of the face elements (for example, the eyes, the nose, the mouth and the like), where the learning data is, for example, the model based on the principal component analysis disclosed in Japanese Patent Application Publication No. 2006-350498. The image processing apparatus 170 may perform the super-resolution processing on the image of each of the face elements included in the characteristic region, by using the learning data selected in association with the face element.

As described above, the image processing apparatus 170 can reconstruct the images of the characteristic regions by using the principal component analysis. The image reconstruction by the image processing apparatus 170 and the learning for the image reconstruction may be realized by, other than the principal component analysis (PCA), locality preserving projection (LPP), linear discriminant analysis (LDA), independent component analysis (ICA), multidimensional scaling (MDS), support vector machine (support vector regression), neural network, hidden Markov model, Bayes estimation, maximum a posteriori (MAP) estimation, iterative back projection (IBP), wavelet transform, locally linear embedding (LLE), Markov random field (MRF), and the like.

The learning data may include low frequency components and high frequency components of the image of an object, which are extracted from a large number of sample images of the object, other than the model disclosed in Japanese Patent Application Publication No. 2006-350498. Here, the low frequency components of the image of each of a plurality of objects of different types may be clustered into a plurality of clusters by using the K-means method or other methods. Each cluster may be associated with a representative low frequency component (for example, the value of a barycenter).

The image processing apparatus 170 extracts a low frequency component from an image of an object contained in a characteristic region in a moving-image-component image. The image processing apparatus 170 then identifies a cluster whose representative low frequency component matches the extracted low frequency component, from among the clusters of low frequency components extracted from sample images of an object, the type of which is the same as the type of the extracted object. The image processing apparatus 170 then identifies a cluster of high frequency components associated with the low frequency components included in the identified cluster. In the above manner, the image processing apparatus 170 can identify the cluster of the high frequency components interrelated to the low frequency component extracted from the object contained in the moving-image-component image.

The image processing apparatus 170 may convert the image of the object into a high-image-quality image having a higher image quality, by using a high frequency component representative of the identified cluster of high frequency components. For example, the image processing apparatus 170 may add, to the image of each object, the high frequency component selected in association with the object, with the weight being determined in accordance with the distance from the center of the object to the processing position on the face. Here, the representative high frequency component of each cluster may be generated by using the closed loop training. As described above, the image processing apparatus 170 may select, for each object, desirable learning data from among pieces of learning data generated by learning the object, and use the selected learning data. Therefore, the image processing apparatus 170 may be able to enhance the image quality of the image of the object more accurately. Note that the image processing apparatus 170 can perform the above-described super-resolution processing on the images of the characteristic regions when included in the image processing system 10 described with reference to FIGS. 1 to 12.

According to the super-resolution processing based on the principal component analysis described in Japanese Patent Application Publication No. 2006-350498, an image of an article is expressed by using a principal component vector and a weighting factor. The data amount of the weighting factor and the principal component vector is significantly smaller than the data amount of the pixel data of the image of the article. Hence, when compressing the images of the characteristic regions of the moving-image-component images obtained from the image capturing section 102, the image processing section 1604 may calculate the above-mentioned weighting factors from the images of the articles contained in the characteristic regions. In other words, the image processing section 1604 can compress the images of the articles contained in the characteristic regions, by representing the images with the use of the principal component vectors and the weighting factors. The image processing section 1604 may transmit the principal component vectors and the weighting factors to the image processing apparatus 170.

In this case, the image processing apparatus 170 can reconstruct the images of the articles contained in the characteristic regions by using the principal component vectors and the weighting factors obtained from the image processing section 1604. Here, the image processing section 1604 can also compress the images of the articles contained in the characteristic regions by using models in which articles are expressed with the use of a variety of other character parameters, other than the model based on the principal component analysis disclosed in Japanese Patent Application Publication No. 2006-350498.

Figure 14:
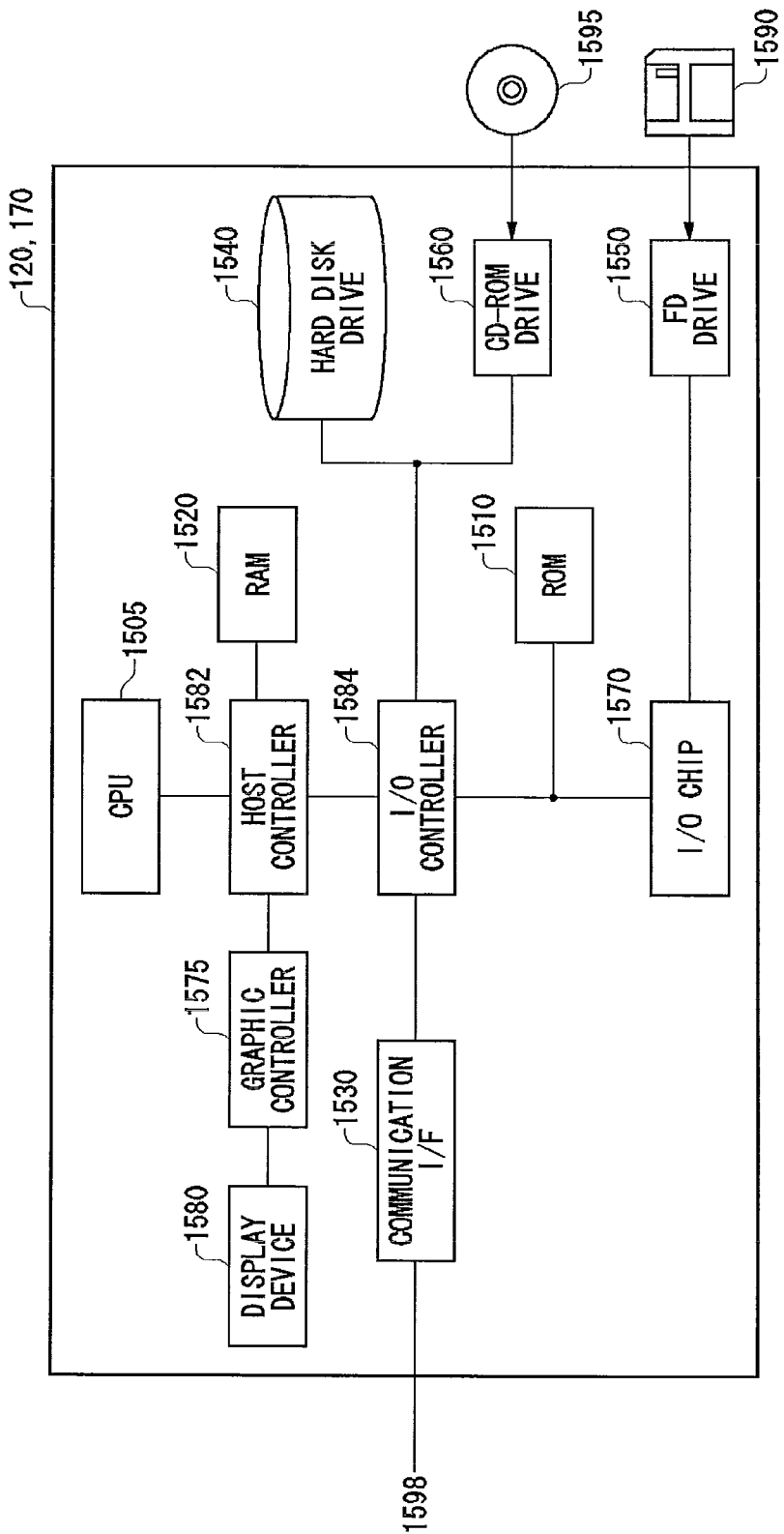
FIG. 14 illustrates an exemplary hardware configuration of image processing apparatuses 120 and 170.

FIG. 14 illustrates an exemplary hardware configuration of the image processing apparatuses 120 and 170. The image processing apparatuses 120 and 170 are each constituted by a CPU surrounding section, an input/output (I/O) section and a legacy I/O section. The CPU surrounding section includes a CPU 1505, a RAM 1520, a graphic controller 1575, and a display device 1580 which are connected to each other by means of a host controller 1582. The I/O section includes a communication interface 1530, a hard disk drive 1540, and a CD-ROM drive 1560 which are connected to the host controller 1582 by means of an I/O controller 1584. The legacy I/O section includes a ROM 1510, a flexible disk drive 1550, and an I/O chip 1570 which are connected to the I/O controller 1584.

The host controller 1582 connects the RAM 1520 with the CPU 1505 and graphic controller 1575 which access the RAM 1520 at a high transfer rate. The CPU 1505 operates in accordance with programs stored on the ROM 1510 and RAM 1520, to control the constituents. The graphic controller 1575 obtains image data which is generated by the CPU 1505 or the like on a frame buffer provided within the RAM 1520, and causes the display device 1580 to display the obtained image data. Alternatively, the graphic controller 1575 may include therein a frame buffer for storing thereon image data generated by the CPU 1505 or the like.

The I/O controller 1584 connects, to the host controller 1582, the hard disk drive 1540, communication interface 1530 and CD-ROM drive 1560 which are I/O devices operating at a relatively high rate. The hard disk drive 1540 stores thereon programs and data to be used by the CPU 1505. The communication interface 1530 couples to the network communication apparatus 1598, to transmit/receive programs or data. The CD-ROM drive 1560 reads programs or data from a CD-ROM 1595, and supplies the read programs or data to the hard disk drive 1540 and communication interface 1530 via the RAM 1520.

The I/O controller 1584 is also connected to the ROM 1510, flexible disk chive 1550 and I/O chip 1570 which are I/O devices operating at a relatively low rate. The ROM 1510 stores thereon a boot program executed by the image processing apparatuses 120 and 170 at the start up, programs dependent on the hardware of the image processing apparatuses 120 and 170, and the like. The flexible disk drive 1550 reads programs or data from a flexible disk 1590, and supplies the read programs or data to the hard disk drive 1540 and communication interface 1530 via the RAM 1520. The I/O chip 1570 is used to connect a variety of I/O devices such as the flexible disk drive 1550 via, for example, a parallel port, a serial port, a keyboard port, a mouse port or the like.

The program to be executed by the CPU 1505 is provided by a user in the state of being stored on a recording medium such as the flexible disk 1590, the CD-ROM 1595, and an IC card. The program may be stored on the recording medium in the state of being compressed or not being compressed. The program is installed from the recording medium onto the hard disk drive 1540, read by the RAM 1520, and executed by the CPU 1505. The program executed by the CPU 1505 causes the image processing apparatus 120 to function as the compressed moving image obtaining section 201, the compressed moving image expanding section 202, the characteristic region detecting section 203, the image dividing section 204, the image generating section 205, the value fixing section 211, the image quality reducing section 221, the coding section 231, the associating section 206, the output section 207, the image quality degrading section 710, and the differential image generating section 720 described with reference to FIGS. 1 to 13. The program executed by the CPU 1505 also causes the image processing apparatus 170 to function as the compressed moving image obtaining section 301, the association analyzing section 302, the compressed moving image expanding section 311, the combining section 303, the output section 304, the image adding section 820 and the image combining section 810 described with reference to FIGS. 1 to 13.

The program mentioned above may be stored on an external recording medium. The recording medium is, for example, an optical recording medium such as DVD and PD, a magnet-optical recording medium such as MD, a tape medium, a semiconductor memory such as an IC card and the like, in addition to the flexible disk 1590 and CD-ROM 1595. The recording medium may be a storage device such as a hard disk or RAM which is provided in a server system connected to a dedicated communication network or the Internet, and the program may be provided to the image processing apparatuses 120 and 170 via the network.

Although some aspects of the present invention have been described by way of the exemplary embodiments, it should be understood that those skilled in the art might make many changes and substitutions without departing from the spirit and the scope of the present invention which is defined only by the appended claims.

The invention claimed is:

1. An image processing apparatus comprising:
a characteristic region detecting section that detects a characteristic region in a plurality of moving-image-component images included in a moving image;
an image dividing section that divides each of the plurality of moving-image-component images into the characteristic region and a background region other than the characteristic region; and
a compressing section that compresses a characteristic region moving image including a plurality of characteristic region images each of which is an image of the characteristic region and a background region moving image including a plurality of background region images each of which is an image of the background region, at different strengths from each other, wherein
the characteristic region detecting section detects a plurality of characteristic regions with different types of characters in the plurality of moving-image-component images,
the image dividing section divides each of the plurality of moving-image-component images into the plurality of characteristic regions and the background region other than the plurality of characteristic regions, and
the compressing section compresses a plurality of characteristic region moving images at strengths determined in accordance with a plurality of pieces of character information of the plurality of characteristic regions.

2. The image processing apparatus as set forth in claim 1, wherein
the compressing section includes
an image quality reducing section that compresses the plurality of characteristic region moving images by reducing image qualities of the plurality of characteristic region moving images in accordance with the plurality of pieces of character information.

3. The image processing apparatus as set forth in claim 2, wherein
the image quality reducing section compresses the plurality of characteristic region moving images by reducing resolutions or frame rates of the plurality of characteristic region moving images in accordance with the plurality of pieces of character information.

4. The image processing apparatus as set forth in claim 2, wherein
the compressing section further includes
a coding section that compresses the plurality of characteristic region moving images by coding the plurality of characteristic region moving images with the use of values set in accordance with the plurality of pieces of character information.

5. The image processing apparatus as set forth in claim 4, wherein
the coding section compresses the plurality of characteristic region moving images by coding the plurality of characteristic region moving images with the use of code amounts determined in accordance with the plurality of pieces of character information.

6. The image processing apparatus as set forth in claim 1, wherein
the characteristic region detecting section detects the plurality of characteristic regions with different types of subjects in the plurality of moving-image-component images included in the moving image, and the compressing section compresses the plurality of characteristic region moving images at strengths determined in accordance with the types of the subjects.

7. The image processing apparatus as set forth in claim 1, wherein
the characteristic region detecting section detects the plurality of characteristic regions with subjects moving at different speeds in the plurality of moving-image-component images, and
the compressing section compresses the plurality of characteristic region moving images at strengths determined in accordance with the speeds of the subjects.

8. The image processing apparatus as set forth in claim 1, further comprising
an image generating section that generates a plurality of characteristic region compression moving images used for generating the plurality of characteristic region moving images and a background region compression moving image used for generating the background region moving image, by duplicating the moving image, wherein
the compressing section compresses the plurality of characteristic region moving images at the strengths determined in accordance with the plurality of pieces of character information.

9. The image processing apparatus as set forth in claim 8, further comprising
a value fixing section that sets, at a fixed value, a pixel value of a region other than the characteristic region in a plurality of moving-image-component images included in each of the plurality of characteristic region compression moving images, wherein
the compressing section compresses each of the plurality of characteristic region moving images which includes the plurality of moving-image-component images in which the pixel value of the region other than the characteristic region is set at the fixed value, at the strength determined in accordance with a corresponding one of the plurality of pieces of the character information.

10. The image processing apparatus as set forth in claim 8, wherein
the image generating section extracts, from the plurality of moving-image-component images, a plurality of characteristic region images for each of the plurality of characteristic regions, to generate each of the plurality of characteristic region compression moving images which includes the extracted plurality of characteristic region images, and
the compressing section compresses the plurality of characteristic region moving images at the strengths determined in accordance with the plurality of pieces of character information.

11. An image processing method comprising:
detecting a characteristic region in a plurality of moving-image-component images included in a moving image;
dividing each of the plurality of moving-image-component images into the characteristic region and a background region other than the characteristic region; and
compressing a characteristic region moving image including a plurality of characteristic region images each of which is an image of the characteristic region and a background region moving image including a plurality of background region images each of which is an image of the background region, at different strengths from each other, wherein
the detecting a characteristic region comprises detecting a plurality of characteristic regions with different types of characters in the plurality of moving-image-component images,
the dividing each of the plurality of moving-image-component images comprises dividing each of the plurality of moving-image-component images into the plurality of characteristic regions and the background region other than the plurality of characteristic regions, and
the compressing a characteristic region moving image comprises compressing a plurality of characteristic region moving images at strengths determined in accordance with a plurality of pieces of character information of the plurality of characteristic regions.

12. A computer readable medium storing therein a program for an image processing apparatus, the program causing a computer to function as:
a characteristic region detecting section that detects a characteristic region in a plurality of moving-image-component images included in a moving image;
an image dividing section that divides each of the plurality of moving-image-component images into the characteristic region and a background region other than the characteristic region; and
a compressing section that compresses a characteristic region moving image including a plurality of characteristic region images each of which is an image of the characteristic region and a background region moving image including a plurality of background region images each of which is an image of the background region, at different strengths from each other, wherein
the characteristic region detecting section detects a plurality of characteristic regions with different types of characters in the plurality of moving-image-component images,
the image dividing section divides each of the plurality of moving-image-component images into the plurality of characteristic regions and the background region other than the plurality of characteristic regions, and
the compressing section compresses a plurality of characteristic region moving images at strengths determined in accordance with a plurality of pieces of character information of the plurality of characteristic regions.

* * * * *